United States Patent
Asahina et al.

(10) Patent No.: US 6,939,642 B2
(45) Date of Patent: Sep. 6, 2005

(54) PRISMATIC BATTERY MODULE AND METHOD FOR MANUFACTURING THE SAME

(75) Inventors: Takashi Asahina, Toyohashi (JP); Shinji Hamada, Toyohashi (JP); Toyohiko Eto, Toyota (JP); Shinsuke Fukuda, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 400 days.

(21) Appl. No.: 09/996,908

(22) Filed: Nov. 30, 2001

(65) Prior Publication Data

US 2003/0077508 A1 Apr. 24, 2003

(30) Foreign Application Priority Data

Nov. 30, 2000 (JP) ......................................... 2000-364827
Aug. 10, 2001 (JP) ......................................... 2001-243421

(51) Int. Cl.[7] .......................... H01M 2/26; H01M 2/28; H01M 2/10
(52) U.S. Cl. ........................................ 429/161; 429/100
(58) Field of Search .................................. 429/158, 160, 429/161, 100; 320/107

(56) References Cited

U.S. PATENT DOCUMENTS

| | | | | |
|---|---|---|---|---|
| 4,464,827 A | * | 8/1984 | Hardin | 29/623.2 |
| 4,603,093 A | * | 7/1986 | Edwards et al. | 429/54 |
| 5,766,798 A | | 6/1998 | Bechtold et al. | |
| 5,871,861 A | | 2/1999 | Hirokou et al. | |
| 6,304,057 B1 | | 10/2001 | Hamada et al. | |
| 6,455,190 B1 | * | 9/2002 | Inoue et al. | 429/160 |

FOREIGN PATENT DOCUMENTS

EP            962993          12/1999

* cited by examiner

*Primary Examiner*—Patrick Joseph Ryan
*Assistant Examiner*—Julian Mercado
(74) *Attorney, Agent, or Firm*—Greenblum & Bernstein, P.L.C.

(57) ABSTRACT

A prismatic battery module includes a prismatic battery case having a plurality of prismatic cell cases connected to one another through separation walls, a planar electroconductive connector forming part of the separation wall between the cell cases, an electrode plate group arranged in each cell case, and an electrolyte placed in each cell case. Lead portions of positive electrode plates and negative electrode plates of the electrode plate group are directly connected to the electroconductive connector. The prismatic battery module requires fewer connection points and provides shorter electrical communication paths, thereby reducing internal resistance.

2 Claims, 27 Drawing Sheets

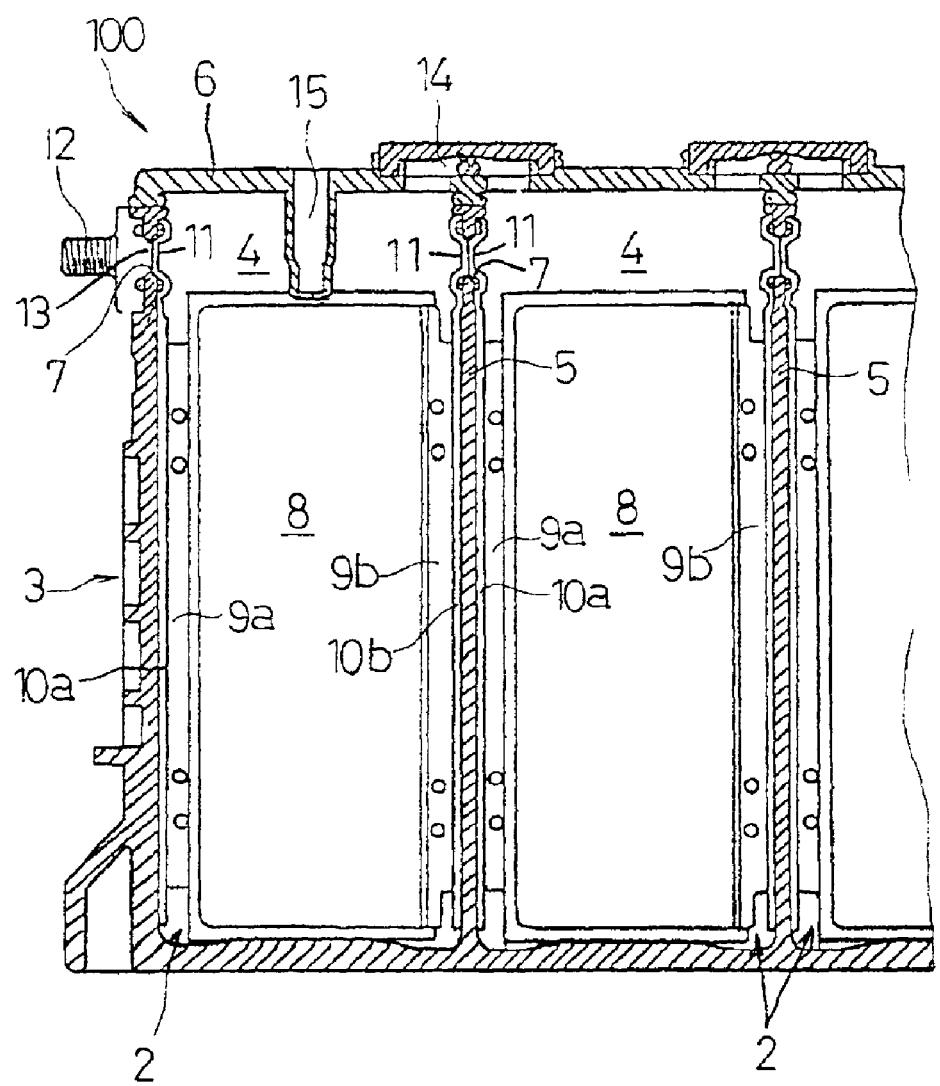

PRISMATIC BATTERY MODULE AND METHOD FOR MANUFACTURING THE SAME

The present disclosure relates to subject matter contained in priority Japanese Patent Application Nos. 2000-364827 and 2001-243421, filed on Nov. 30, 2000 and Aug. 10, 2001 respectively, the contents of which is herein expressly incorporated by reference in its entirety.

BACKGROUND OF THE INVENTION

1. Field of the Invention

The present invention relates to a prismatic battery module and a method for manufacturing the same. More particularly, the invention relates to a prismatic battery module which is made by connecting a plurality of cells together and designed to reduce an internal resistance, and a method for manufacturing the same.

2. Description of Related Art

A conventional rechargeable battery module made by connecting a plurality of cells together, each having an individual cell case, has a problem that the connection path between the cells is long and the number of connection points in the battery module is large, thereby increasing the component resistance leading to the increase of internal resistance thereof.

In consideration of the aforementioned conventional problem, the inventors of this invention have proposed a prismatic battery module 100 including a plurality of cells 2 as shown in FIGS. 32 and 33. Reference numeral 3 denotes a prismatic battery case constructed in such a manner that a plurality of prismatic cell cases 4 of cells 2, each cell case having short lateral walls and long lateral walls, are integrally connected together in series, and each pair of cell cases shares short lateral walls thereof as a separation wall 5, and further, an upper opening of each of the cell cases is closed by a unitary lid 6. In the upper portions of outer short lateral walls of the outermost cell cases and the separation wall 5 between the adjacent cell cases 4 are formed connection holes 7. Within each of the cell cases 4, an electrode plate group 8 constructed by alternately stacking rectangular positive and negative electrode plates interposing a separator therebetween is accommodated together with an electrolyte. The positive and the negative electrode plates constituting the electrode plate group 8 project from the electrode plate group in opposite directions to form a lead portion 9a of the positive electrode plate and a lead portion 9b of the negative electrode plate, respectively. To the side ends of the lead portions 9a, 9b are connected collector plates 10a, 10b, respectively, by welding or the like.

In the upper portions of the collector plates 10a, 10b are formed connection projections 11 to be fitted into the connection holes 7, and the connection projections 11 of the collector plates 10a, 10b as positive and negative poles respectively are connected to each other between the adjacent cell cases 4 by welding. Furthermore, in the connection holes 7 of the outer short lateral walls of the outermost cell cases 4 are mounted connection terminals 12 as either a positive or negative pole, and a connection projection 13 of the connection terminal 12 and the connection projection 11 of either the collector plate 10a or 10b are connected to each other by welding. Thus, a plurality of cells 2 accommodated in the prismatic battery case 3 are connected together in series.

Additionally, in the lid 6 are provided a communication path 14 for balancing the internal pressure between the cell cases 4, a safety vent (not shown) for discharging the pressure when the internal pressure of the cell case 4 exceeds a predetermined value and a sensor fixing hole 15 for fixing a temperature sensor thereto to detect the temperature of the cell 2.

According to the above-described construction of battery, since the electrical communication path from the positive and negative electrode plates of the electrode plate group 8 to the respective lead portions 9a, 9b is short and further the adjacent lead portions 9a, 9b of the associated electrode plate groups are connected to each other via the associated collector plate 10a, 10b within the prismatic battery case 3, the connection path between the electrode plate groups is short and the number of connection points is small, thereby allowing the prismatic battery module to reduce the component resistance included therein and in proportion thereto, reduce the internal resistance.

However, although the prismatic battery module 100 shown in FIGS. 32 and 33 is constructed so that the connection path from the positive and negative electrode plates to the respective collector plates 10a, 10b via the respective lead portions 9a, 9b is short, as is denoted by arrows in FIG. 34, the adjacent collector plates 10a, 10b of the associated electrode plate groups are connected at one point of both ends of the connection projections 11 located at the upper portions of the adjacent collector plates by welding and therefore, there have been seen problems that the entire connection path between the adjacent electrode plate groups becomes longer and in addition, the internal resistance between the cells becomes higher since the electrical communication between the adjacent collector plates is performed at only one point. Furthermore, there have also been seen problems that the collector plates 10a, 10b employed in the battery 100 increases the manufacturing cost of battery correspondingly, and further, it is necessary to arrange the collector plates 10a, 10b on both sides of the electrode plate group 8 and to form the upper portion of the collector plates 10a, 10b so as to project beyond the upper end of the electrode plate group 8, thereby forcing enlargement of the volume of the cell case 4.

SUMMARY OF THE INVENTION

In consideration of the above problems seen in the conventional technique, an object of the present invention is to provide a prismatic battery module in which the internal resistance per cell is reduced, and a method for manufacturing the same.

A prismatic battery module according to the invention includes a prismatic battery case having a plurality of prismatic cell cases connected to one another through separation walls, an electroconductive connector forming at least a part of the separation wall between the cell cases, an electrode plate group arranged in each cell case, and an electrolyte accommodated in each cell case. In the prismatic battery module, positive electrode plates and negative electrode plates, which together constitute the electrode plate group, are connected to respective electroconductive connectors arranged on both sides of the cell case. This construction requires fewer connection points and provides shorter electrical communication paths since the positive electrode plates of an electrode plate group in a cell case are connected to the negative electrode plates of an adjacent electrode plate group in an adjacent cell case only through the electroconductive connector, which forms the separation wall between the cell cases. As a result, internal resistance is reduced. Also, the prismatic battery module of the present invention does not require a collector plate and thus helps reduce its volume as well as its costs.

A method for manufacturing a prismatic battery module according to the invention, includes the steps of: connecting a plurality of prismatic cell cases with each other through separation walls, at least part of which is formed of an electroconductive connector, thereby form a prismatic battery case; forming an electrode plate group having lead portions of positive and negative electrode plates by projecting one side portion of the positive electrode plates and one side portion of the negative electrode plates in opposite directions, respectively; placing the electrode plate group in each of the cell cases to connect the lead portions on either side of the electrode plate group to the respective electroconductive connectors arranged on both sides of the cell case; placing an electrolyte in the cell cases; and closing an opening of each cell case with a lid.

Another method for manufacturing a prismatic battery module according to the invention, includes the steps of: forming a prismatic battery case having a space, in which a plurality of cell cases are to be formed in a row; forming an electrode plate group having lead portions of positive and negative electrode plates by projecting one side portion of the positive electrode plates and one side portion of the negative electrode plates in opposite directions; connecting the lead portions of the positive and the negative electrode plates of the adjacent electrode plate groups with each other through electroconductive connector plates; placing the plurality of electrode plate groups, which are connected with each other through the electroconductive connector plates, in the prismatic battery case and providing sealing between peripheral edges of the electroconductive connector plates and the inner surface of the prismatic battery case; placing an electrolyte in the cell cases defined by the electroconductive connector plates; and closing an opening of each cell case with a lid.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 32 is a partial vertical cross-sectional front view of a conventional prismatic battery module;

DETAILED DESCRIPTION OF THE PREFERRED EMBODIMENTS

[First Embodiment]

Figure 33:
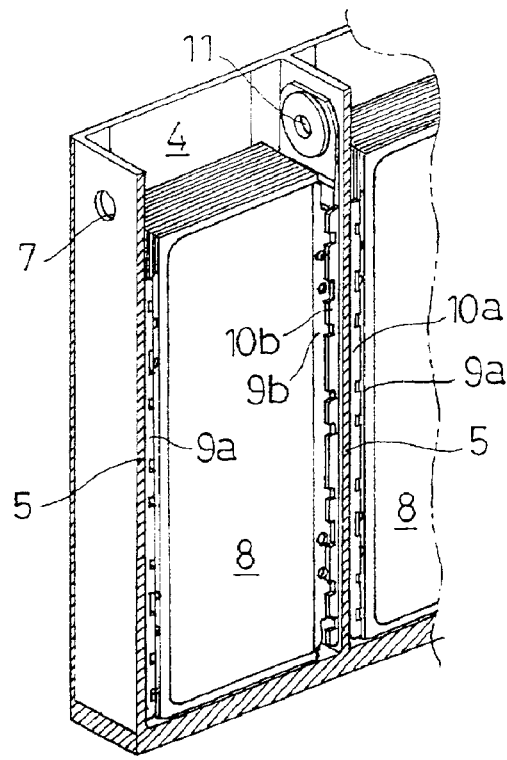
FIG. 33 is a partially cutaway perspective view showing a cell case of the conventional prismatic battery module.
Figure 34:
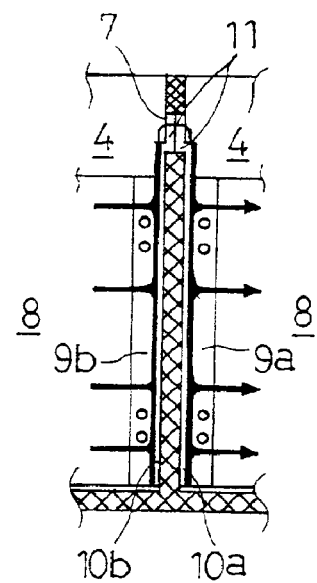
FIG. 34 is a descriptive view illustrating the electrical communication paths in the conventional prismatic battery module.

A first embodiment of a prismatic battery module of the present invention will now be described with reference to FIGS. 1 through 5, in which elements identical to those of the prior art described with reference to FIGS. 32 and 33 are denoted by the same reference numerals. The following description is primarily directed to the differences from the prior art.

Figure 1:
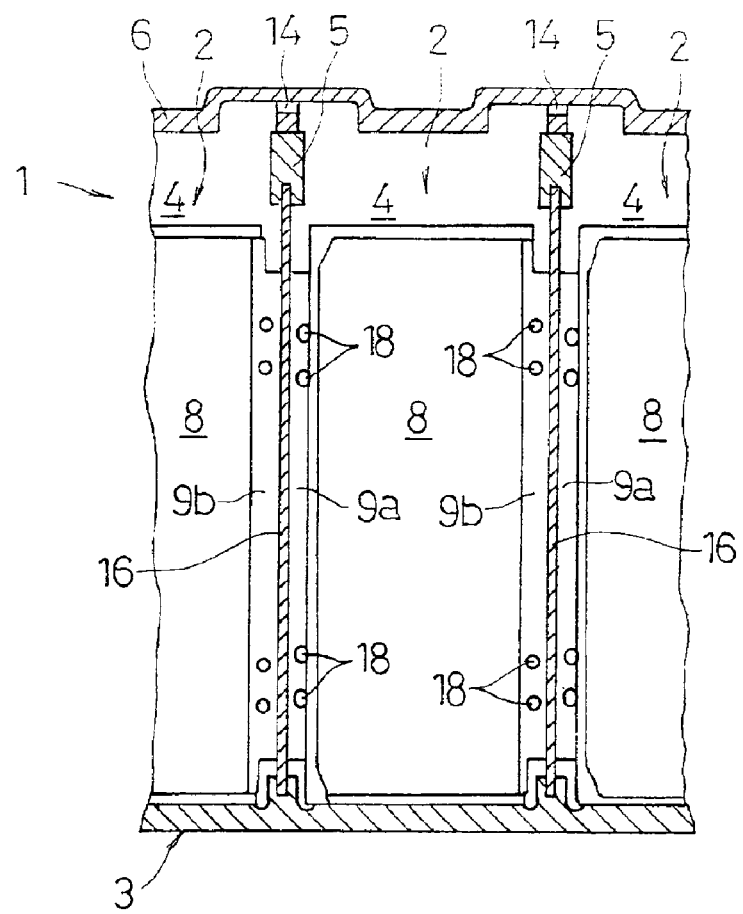
FIG. 1 is a partial vertical cross-sectional view of a first embodiment of a prismatic battery module of the present invention.
Figure 2:
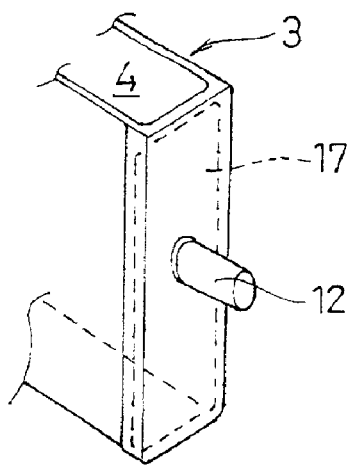
FIG. 2 is a perspective view showing one end of a prismatic battery case of the first embodiment.
Figure 3:
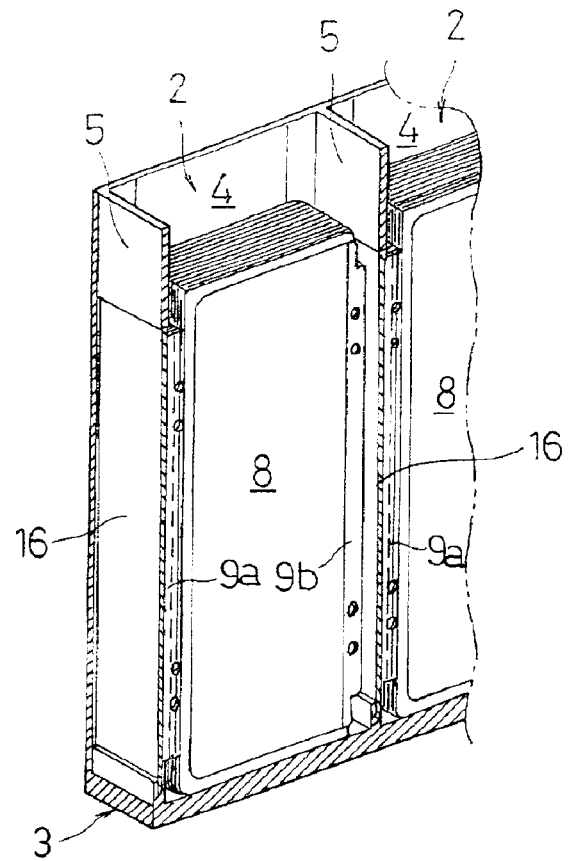
FIG. 3 is a partially cutaway perspective view showing a cell case of the first embodiment.
Figure 4:
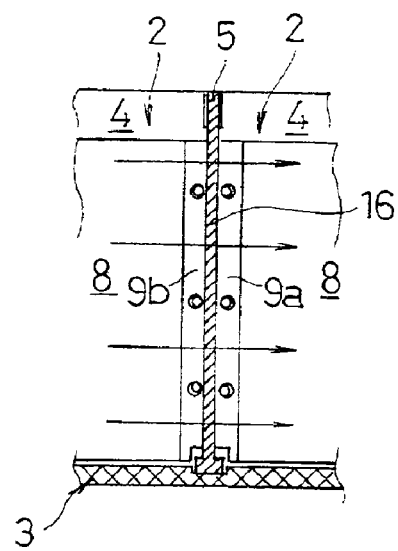
FIG. 4 is a descriptive view illustrating the electrical communication paths in accordance with the first embodiment.
Figure 5:
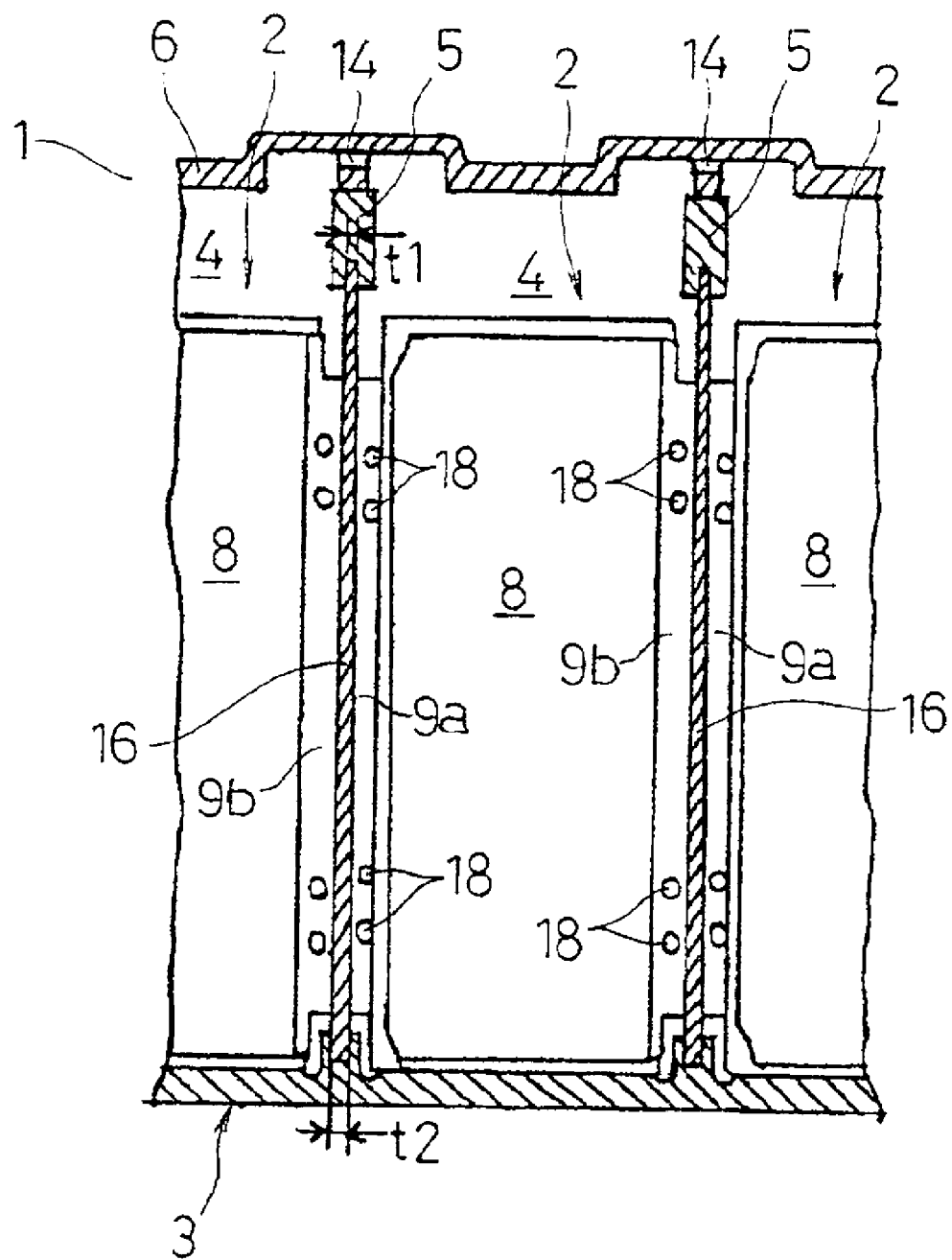
FIG. 5 is a partial vertical cross-sectional view of a variation of the first embodiment.

Referring first to FIGS. 1 to 3, a prismatic battery module 1 of the first embodiment includes a plurality of cells 2, each of which is constructed as a nickel metal hydride battery. A prismatic battery case 3, formed as a flat rectangular parallelepiped, includes a plurality of prismatic cell cases 4 for the cells 2. Each cell case 4 has short sides and long sides and is connected to adjacent ones by sharing the short sides, which serve as a separation wall 5 for forming the prismatic battery case 3. A lid 6 covers openings at the top of the cell cases 4 connected to one another. The lid 6 includes a communication path 14 for balancing the internal pressure between the individual cell cases 4, a safety vent (not shown) for discharging the pressure when the internal pressure of the individual cell case 4 exceeds a predetermined value and a sensor fixing hole for fixing a temperature sensor thereto to detect the temperature of the cell 2.

Each separation wall 5 between the cell cases 4 includes a planar connector plate 16, which forms at least a part of, and in the embodiment shown, substantially entire part of, the separation wall 5, except the outermost areas thereof. The planar connector plate 16 is integrally formed with the prismatic battery case 3 by insert molding. As shown in FIG. 2, a connector plate 17, which is an equivalent of the connector plate 16, is arranged on the inside of the outermost short side of the connected cell cases 4 on either end of the prismatic battery case 3. A positive or negative connection terminal 12 extends from the central portion of the connector plate 17, through the short side wall of the cell case 4, and out of the prismatic battery case 3.

Each cell case 4 accommodates an electrode plate group 8 with an electrolyte to form the cell 2. The electrode plate group 8 is formed by stacking positive and negative rectangular electrode plates with intervening separators. The positive electrode plates and the negative electrode plates have extensions on opposite sides of the electrode plate group 8 to form positive lead portions 9a and negative lead portions 9b, respectively. The lead portions 9a and the lead portions 9b of adjacent cells are connected to one another by the connector plates 16 or 17 on both sides of the cell case 4. The lead portions 9a and the lead portions 9b are connected to the corresponding connector plate 16 or 17 by using an electrolyte-resistant, electroconductive adhesive, or by employing resilient lead portions 9a and 9b and pressing them against the connector plate 16 or 17. A plurality of spaced-apart support holes are provided in the lead portions 9a and 9b and are denoted by a reference numeral 18. With a positioning pin passed through each support hole 18, the side edges of the lead portions 9a (and 9b) are pressed against one another, so that the side edges of the lead portions 9a (and 9b) are aligned with each other and thus are uniformly held in contact with the connector plate 16 or 17. In this manner, the plurality of cells 2 accommodated in the prismatic battery case 3 are connected in series through the planar connector plates 16 of the separation walls 5.

The electrode plate group 8 is formed by alternately stacking positive electrode plates and negative electrode plates with each positive electrode plate covered with a bag-like separator having a side opening. In this manner, the electrode plate group 8 is provided as a stack of the positive electrode plates and the negative electrode plates with intervening separators. The positive electrode plate is formed of a Ni foamed metal, which is filled with nickel hydroxide except the part that corresponds to the lead portion 9a. The lead portion 9a is formed by compressing the foamed metal and then seam-welding a lead plate onto one surface of the compressed metal using ultrasound. The negative electrode plate is formed by applying a paste containing a hydrogen-occluding alloy onto a Ni punched metal, except the part that corresponds to the lead portion 9b.

An electrolyte is placed in each cell case 4 and the openings of the cell cases 4 are closed with the lid 6. This completes the prismatic battery module 1.

In the prismatic battery module 1 having the above-described construction, the side edges of the positive lead portions 9a of the electrode plate group 8 in one of the cell cases 4 are directly connected with the side edges of the negative lead portions 9b of another electrode plate group 8 in the adjacent cell case 4, with the side edges of the lead portions 9a and 9b kept in contact with the planar connector plate 16 in their entire lengths. Since the lead portions 9a over their entire lengths are held in connection with the lead portions 9b only through the planar connector plate 16, the current flows through the straight paths between the adjacent electrode plate groups 8 in the adjacent cells 2, as indicated by the arrows in FIG. 4. Accordingly, the required number of the connection points is reduced and significantly short paths are provided for the current flow. This not only leads to a substantial decrease in the internal resistance but leads also to a more direct and simpler connection, which enables a significant cost reduction. Furthermore, unlike the prior art, the prismatic battery module 1 according to this embodiment does not require the collector plate, which may lead to a reduction in the cost and help decrease the volume of the cell case.

While the example shown in FIGS. 1 through 4 employs the planar connector plate 16 with a uniform thickness, the connector plate 16 may have a thickness that increases in the vertical direction from the thickness t1 at the top of the cell case 4 to the thickness t2 at the bottom of the cell case 4, given that t1<t2. In this manner, the lead portions 9a and 9b are brought into firm contact with the connector plate 16 or 17 to provide reliable connection by simply inserting the electrode plate group 8 into the cell case 4 from above.

[Second Embodiment]

Figure 6A:
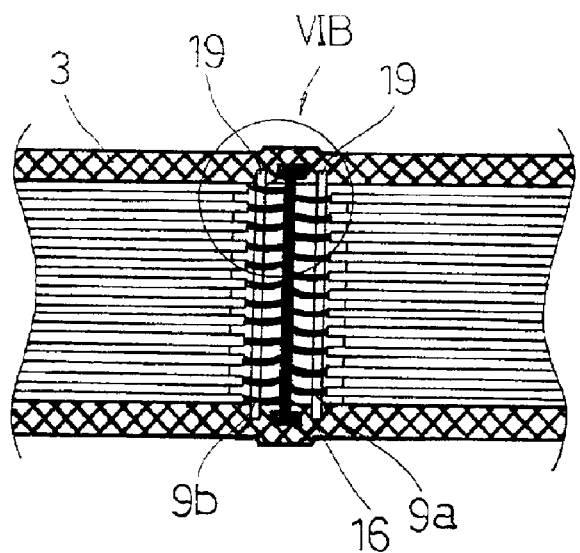
FIG. 6A is a horizontal cross-sectional view showing the adjacent region of a separation wall in accordance with a second embodiment of the prismatic battery module of the invention.
Figure 6B:
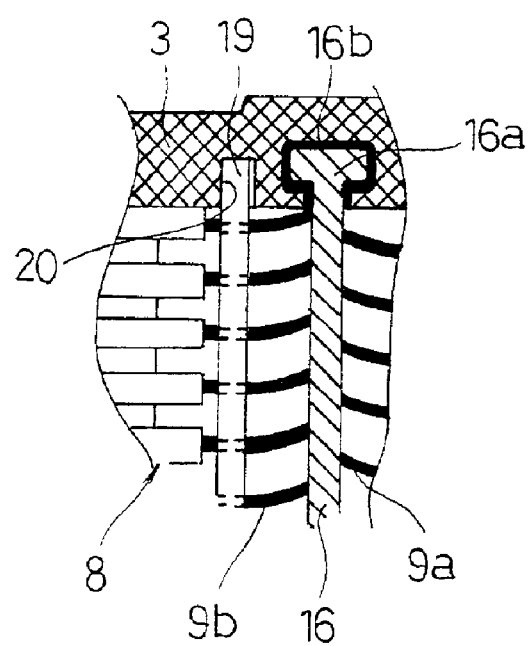
FIG. 6B is an enlarged view of the encircled part VIB in FIG. 6A.

Next, a second embodiment of the prismatic battery module of the invention is described with reference to FIGS. 6A and 6B. In the following description, elements identical to those described in reference to the previous embodiment are denoted by the same reference numerals and the description thereof will not be repeated. The embodiment, therefore, is described only in terms of the differences.

In this embodiment, a support pin 19 is placed through each of the support holes 18 formed in the lead portions 9a and 9b of the positive and the negative electrode plates of the electrode plate group 8. Also, vertical slots 20 are formed on the opposite side walls of the cell case 4 at positions opposite to one another on either side of the separation wall 5, which is arranged between the adjacent cell cases 4 of the prismatic battery case 3, so that the vertical slots 20 opposite to one another receive respective ends of the support pin 19 while ends of the lead portions 9a and 9b are being resiliently pressed against the planar connector plate 16.

In this manner, the force resulting from the resilient contact between the lead portions 9a and 9b and the planar connector plate 16 is borne by the vertical slots 20 in the prismatic battery case 3 via the support pin 19. This ensures the firm contact of the lead portions 9a and 9b with the planar connector plate 16. In addition, this construction allows the components to be connected with small resistance and high reliability.

In this embodiment, the planar connector plate 16 is formed to have an enlarged portion 16a on either end that is anchored within the side wall of the prismatic battery case 3. This construction ensures the integrity as well as the liquid-tightness of the prismatic battery case 3 when the connector plate 16 is insert-molded with the prismatic battery case 3. The construction also ensures that the components are held together against the expansion of the cell case 4. Preferably, a coating layer 16b is disposed on the outer surface of the enlarged portion 16a to improve the sealing performance between the prismatic battery case 3, which is formed of a resin material, and the planar connector plate 16, which is formed of a metal material.

[Third Embodiment]

Figure 7A:
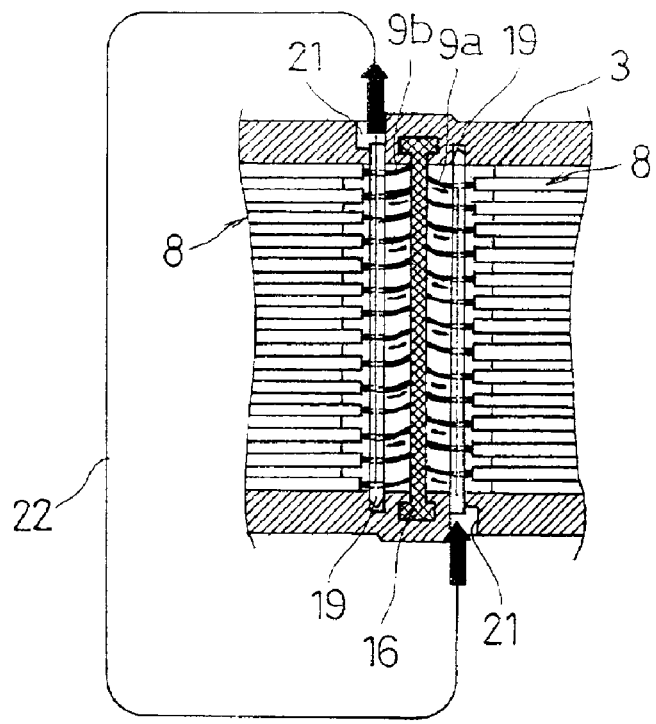
FIG. 7A is a horizontal cross-sectional view showing the adjacent region of a separation wall where the lead portions are welded to the connector plate in accordance with a third embodiment of the prismatic battery module of the invention.
Figure 7B:
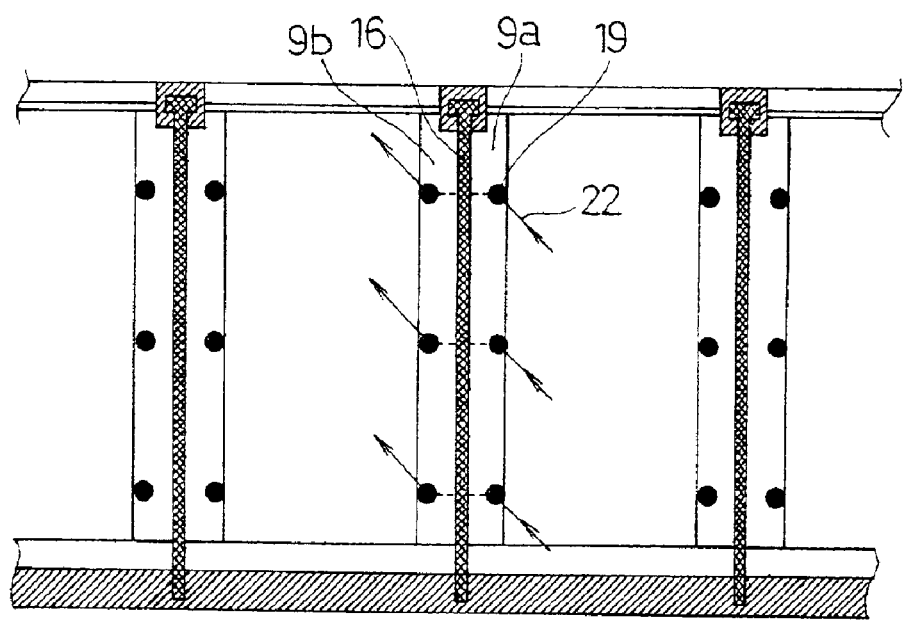
FIG. 7B is a vertical cross-sectional front view showing the electrical communication paths of the welding current.

Next, a third embodiment of the prismatic battery module of the invention is described with reference to FIGS. 7A and 7B.

In this embodiment, the planar connector plate 16 is welded to the lead portions 9a and 9b by applying a welding current that flows through a path between the adjacent support pins 19, which have been described in the second embodiment above and are arranged on both sides of the planar connector plate 16. The welding current flows through the support pin 19, the lead portions 9a, the planar connector plate 16, the lead portions 9b, and the support pin 19 adjacent to the first one to weld the contacts between the planar connector plate 16 and the lead portions 9a and 9b.

For this purpose, a pair of work openings 21 are preferably provided on the respective side walls of the prismatic battery case 3 for providing the welding current: one of the work openings 21 is formed on one of the opposite side walls at a position adjacent to one end of the support pin 19, which is arranged on one side with respect to the planar connector plate 16, while the other of the work openings 21 is formed on the other side wall at a position adjacent to one end of the adjacent support pin 19, which is arranged on the other side with respect to the planar connector plate 16. The electrode plate group 8 is placed in each cell case 4 of the prismatic battery case 3 with its associated support pins 19 received in the respective vertical slots 20. In this state, one end of the support pin 19 that is arranged on one side with respect to the planar connector plate 16 and the opposite end of the adjacent support pin 19 that is arranged on the other side with respect to the planar connector plate 16 are exposed in the respective work openings 21. A pair of welding electrodes (not shown) are then connected to the respective ends of the support pins 19 on both sides of the connector plate 16 to allow the welding current 22 to flow in the direction indicated by the arrows. In this manner, the planar connector plate 16 is welded to the lead portions 9a and 9b without affecting the electrode plates of the electrode plate group 8. After welding has been completed, the work openings 21 are sealed with resin.

In this embodiment, resistance is further reduced and more reliable connection is provided since the planar connector plate 16 is welded to the lead portions 9a and 9b. It should be appreciated, however, that welding techniques other than the above-described resistance welding may also be used. For example, a solder may be applied to the engaging portions of the planar connector plate 16 and the lead portions 9a and 9b and is then melted by resistance heat to solder the components.

[Fourth Embodiment]

Next, a fourth embodiment of the prismatic battery module of the invention is described with reference to FIGS. 8A and 8B.

Figure 8A:
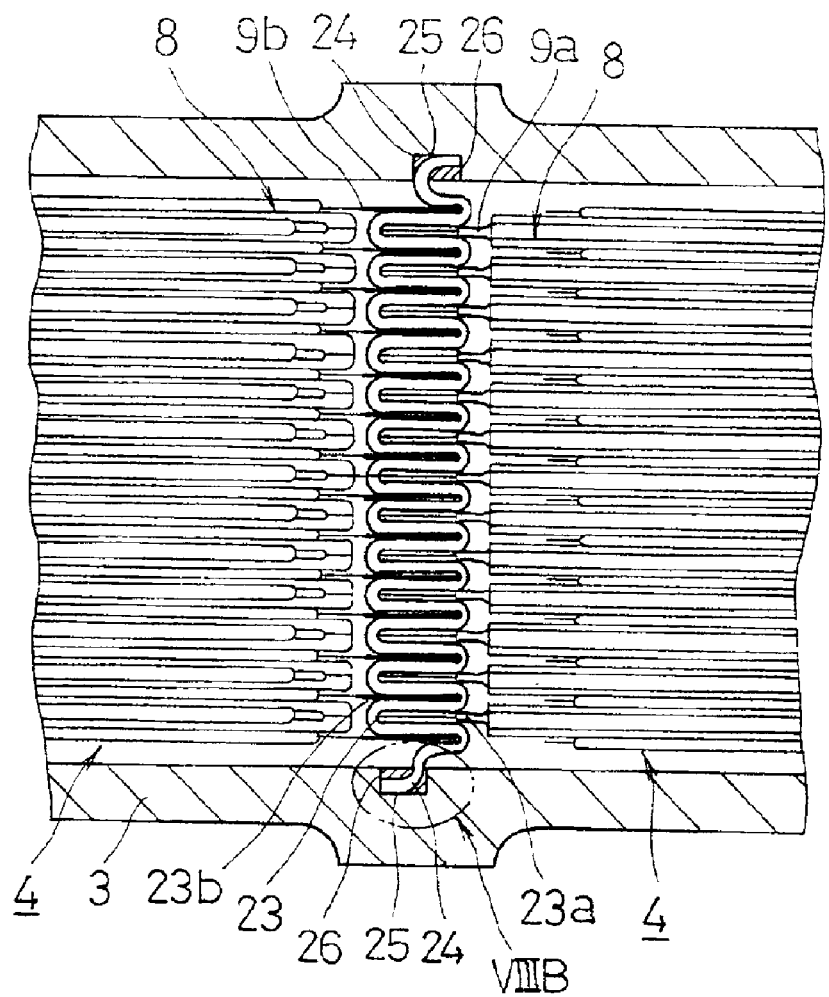
FIG. 8A is a horizontal cross-sectional view showing the adjacent region of a separation wall in accordance with a fourth embodiment of the prismatic battery module of the invention.
Figure 8B:
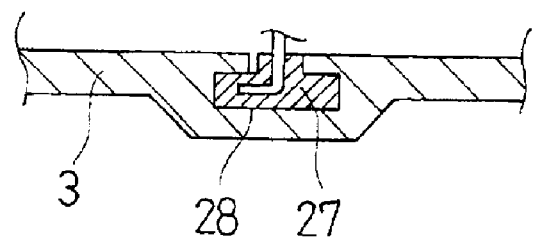
FIG. 8B is an enlarged view showing a variation of the encircled part VIIIB in FIG. 8A.

As shown in FIG. 8A, this embodiment uses a corrugated connector plate 23 to serve as an electroconductive connector. The corrugated connector plate 23 is connected to the lead portions 9a and 9b by inserting the lead portions 9a and 9b of the positive and the negative electrode plates of the electrode plate group 8 into respective troughs 23a and 23b of the corrugated connector plate 23 and then compressing the corrugation. As a result, the adjacent electrode plate groups 8 are connected to one another through the corrugated connector plate 23. A row of the cell cases 4 each housing an electrode plate group 8 is constructed by connecting a desired number of the electrode plate groups 8 with each other through the corrugated connector plates 23, inserting the connected electrode plate groups 8 into the prismatic battery case 3 and joining both ends of each corrugated connector plate 23 to the side walls of the prismatic battery case 3 in a liquid-tight manner.

In this regard, a connection bent 24 is formed on either end of the corrugated connector plate 23, and a slot 25 for receiving the connection bent 24 is formed at a position corresponding to the separation wall 5 between the cell cases 4 in the prismatic battery case 3. The slot 25 is filled with a sealing material 26 such as pitch to complete the cell case 4. In an alternative construction, a T-shaped connection part 27, made of resin, is arranged on either end of the corrugated connector plate 23. A T-shaped slot 28 is formed at a position corresponding to the separation wall 5 between the cell cases 4 in the prismatic battery case 3. The connection part 27 is coated with a sealing material and is then placed in the T-shaped slot 28.

This embodiment, in which the lead portions 9a and 9b are inserted into the respective troughs 23a and 23b of the corrugated connector plate 23 and are secured by compressing the corrugation, is advantageous in that a large area of contact is achieved, thereby ensuring reliable connection and a reduced resistance. According to this embodiment, the prismatic battery module is manufactured in an efficient manner by first connecting a plurality of the electrode plate groups 8 with each other through the corrugated connector plate 23, inserting the electrode plate groups 8 connected through the corrugated connector plates 23 into the prismatic battery case 3 and then sealing edges of each corrugated connector plates 23.

Although the prismatic battery module may be manufactured by first placing the corrugated connector plates 23 in the prismatic battery case 3 to form the cell cases 4, then inserting the lead portions 9a and 9b of the electrode plate groups 8 into the respective troughs 23a and 23b, and then compressing the corrugation within the cell case 4, the above-described embodiment provides a more viable and efficient method.

[Fifth Embodiment]

Next, a fifth embodiment of the prismatic battery module of the invention is described with reference to FIGS. 9 to 12.

Figure 9:
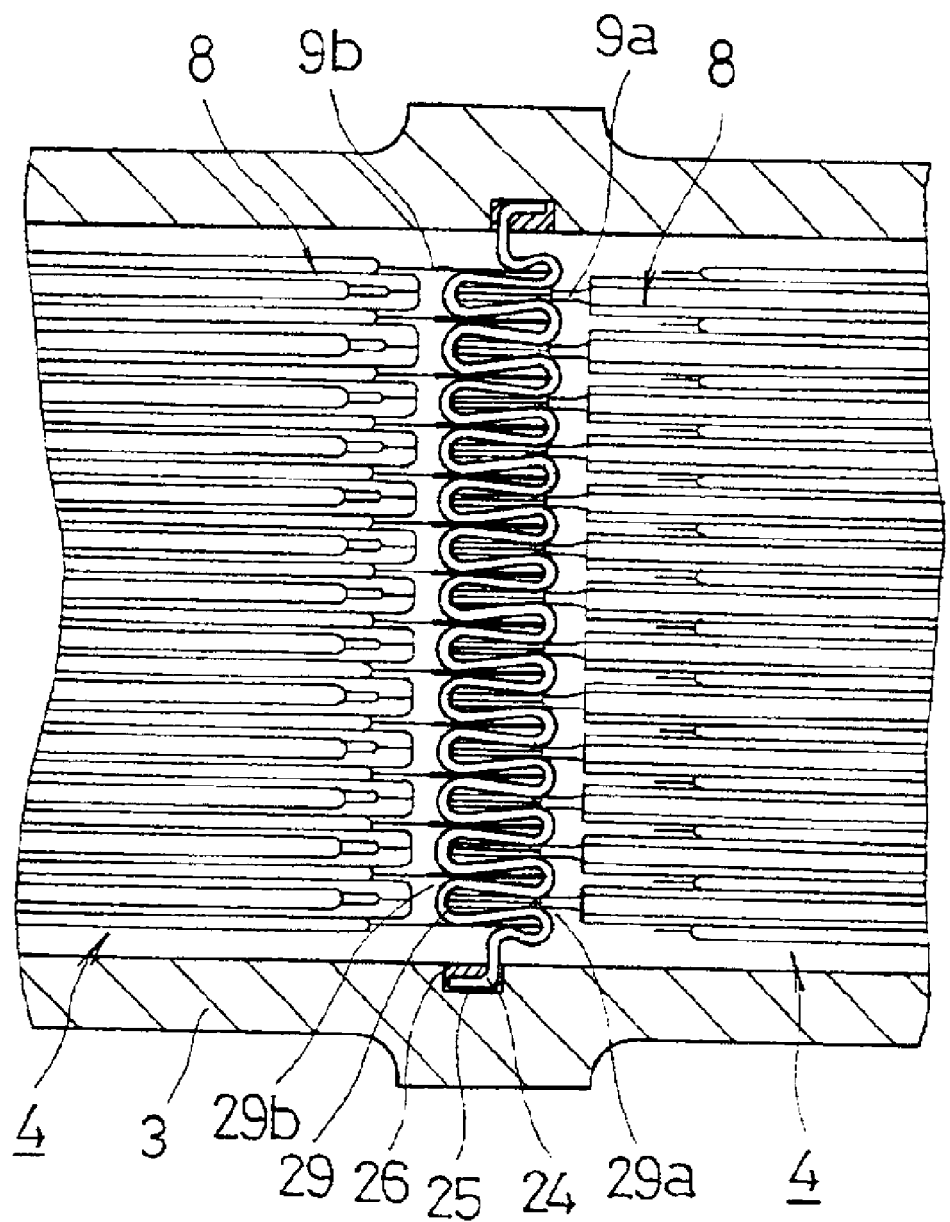
FIG. 9 is a horizontal cross-sectional view showing the adjacent region of a separation wall in accordance with a fifth embodiment of the prismatic battery module of the invention.

As shown in FIG. 9, this embodiment employs a corrugated connector plate 29 having resilience to serve as an electroconductive connector. The lead portions 9a and 9b of the electrode plates are inserted into respective troughs 29a and 29b of the corrugated connector plate 29 so that the corrugated connector plate 29 resiliently holds the lead portions 9a and 9b of the respective electrode plates of the electrode plate group 8 between its folds. In the example shown in FIG. 9, each of the troughs 29a and 29b has a pouch-like shape with a space defined therein and with its opening resiliently closed from both sides to hold the lead portions 9a and 9b.

This embodiment achieves a larger contact area between the corrugated connector plate 29 and the lead portions 9a and 9b as compared to the case wherein the lead portions 9a and 9b are simply in contact with the connector plate. Consequently, resistance is reduced and reliable connection is achieved according to this embodiment. Further, this embodiment facilitates the connection process since the connection between the components is achieved by simply inserting the lead portions 9a and 9b into the respective troughs 29a and 29b of the corrugated connector plate 29.

Figure 10:
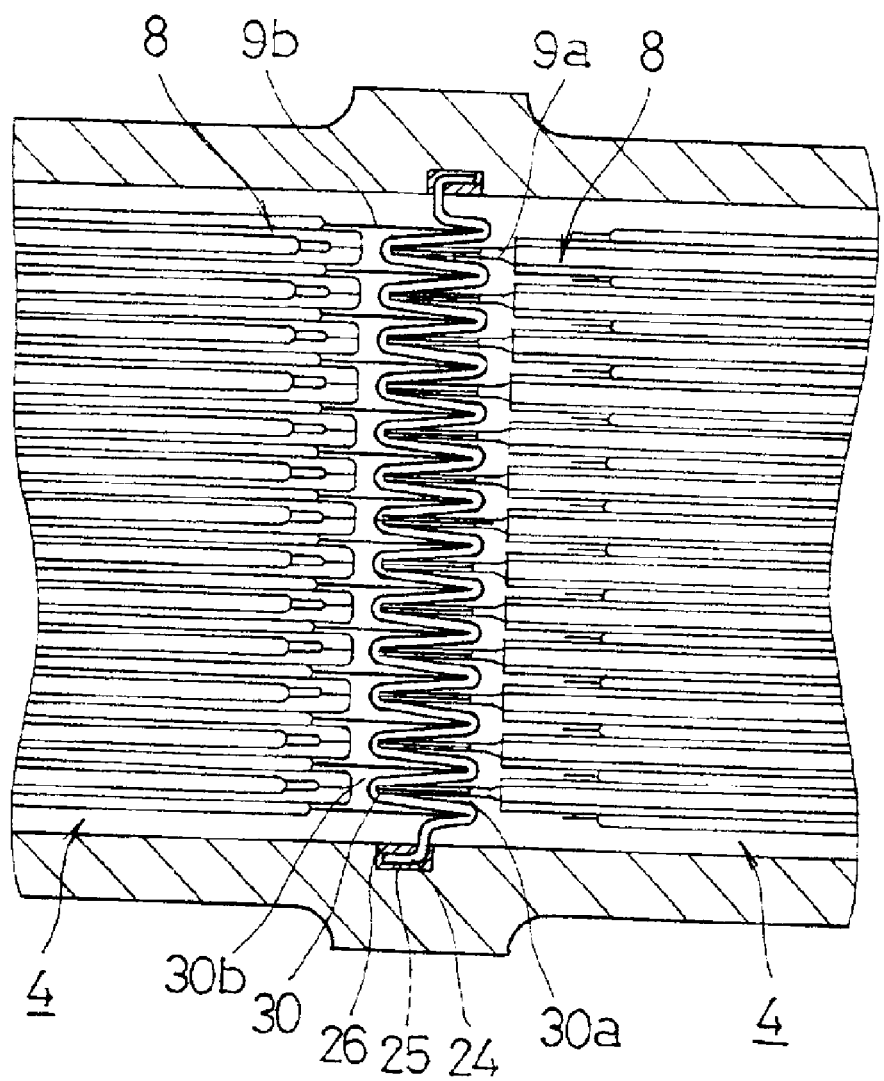
FIG. 10 is a horizontal cross-sectional view showing the adjacent region of a separation wall in a first variation of the fifth embodiment.

Referring to FIG. 10, a first variation of this embodiment uses a corrugated connector plate 30 having resilience. The corrugated connector plate 30 includes V-shaped troughs 30a and 30b with the widths thereof narrowing toward the bottom of the trough. The lead portions 9a and 9b are held in the narrow bottom regions of the troughs.

Figure 11:
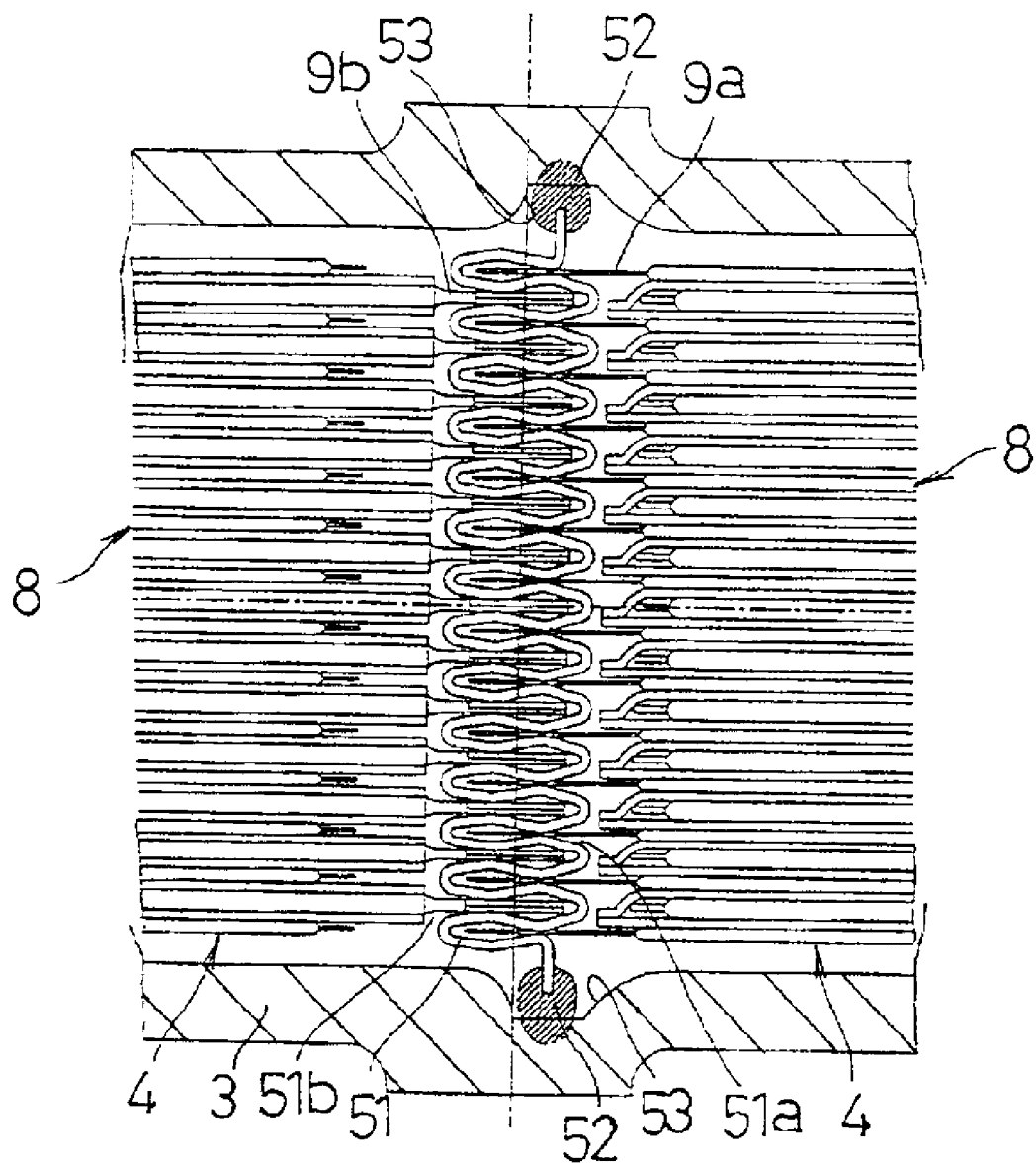
FIG. 11 is a horizontal cross-sectional view showing the adjacent region of a separation wall in a second variation of the fifth embodiment.

Referring to FIG. 11, a second variation uses a corrugated connector plate 51 having resilience. The corrugated connector plate 51 includes pouch-like troughs 51a and 51b with lozenge-shaped spaces defined therein and with their openings resiliently closed from both sides to hold the lead portions 9a and 9b. A seal rubber 52 is fixedly baked to either side edge of the corrugated connector plate 51, and a seal slot 53 for receiving the seal rubber 52 is formed on the inner surface of each side wall of the prismatic battery case 3 at a position to install the corrugated connector plate 51.

Figure 12:
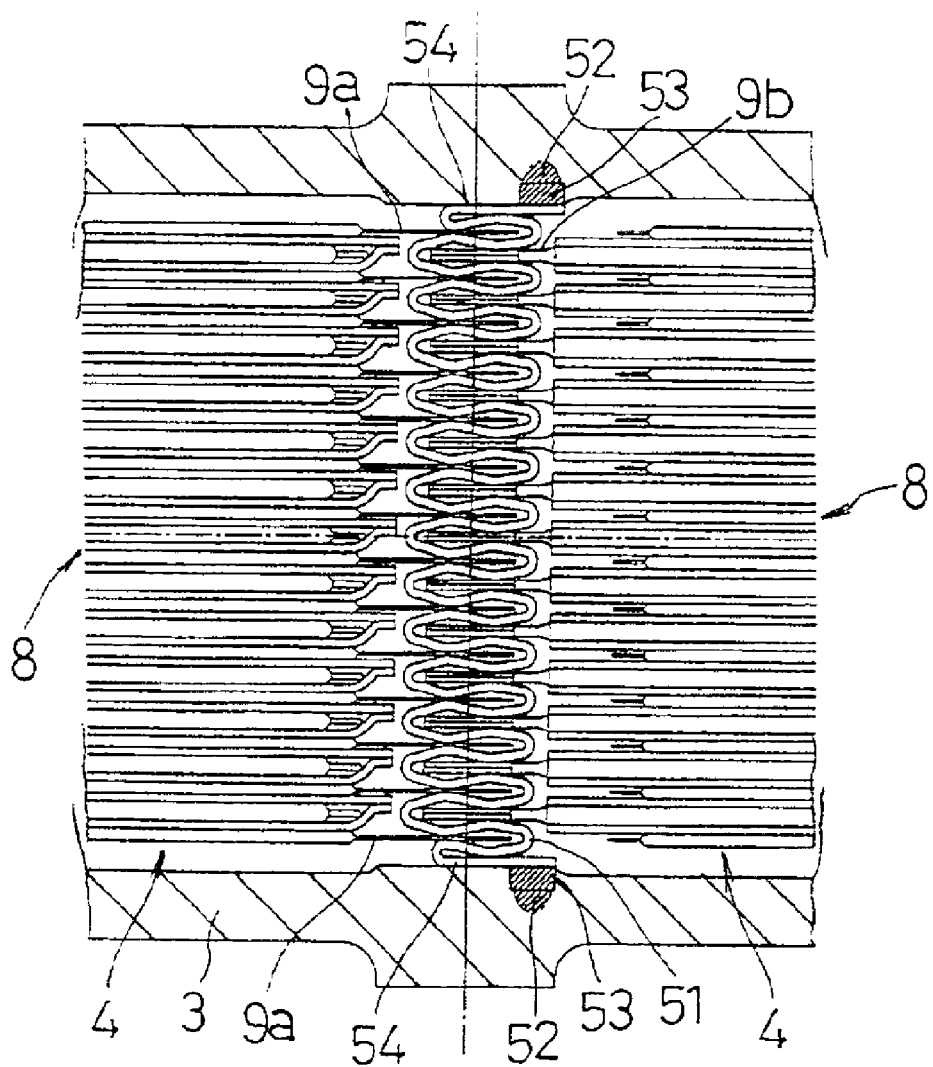
FIG. 12 is a horizontal cross-sectional view showing the adjacent region of a separation wall in a third variation of the fifth embodiment.

In a third variation as shown in FIG. 12, the resilient corrugated connector plate 51 includes on either side edge thereof a pressure-receiving portion 54, which is pressed against the inner surface of each side wall of the prismatic battery case 3. Pressure is applied to the prismatic battery case 3 from outside and is transmitted through the side wall to the pressure-receiving portion 54 to keep the lead portions 9a and 9b held by the corrugated connector plate 51. The seal rubber 52, fixedly baked to the outer surface of the edge of the pressure-receiving portion 54, engages with the seal slot 53 formed on each side wall to provide sealing. This variation ensures that the corrugated connector plate 51 is held in contact with the lead portions 9a and 9b with a substantial pressure through application of restrictive force to the prismatic battery case 3 from outside. Consequently, a further reduction in resistance is achieved.

[Sixth Embodiment]

Next, a sixth embodiment of the prismatic battery module of the invention is described with reference to FIGS. 13 and 14.

Figure 13:
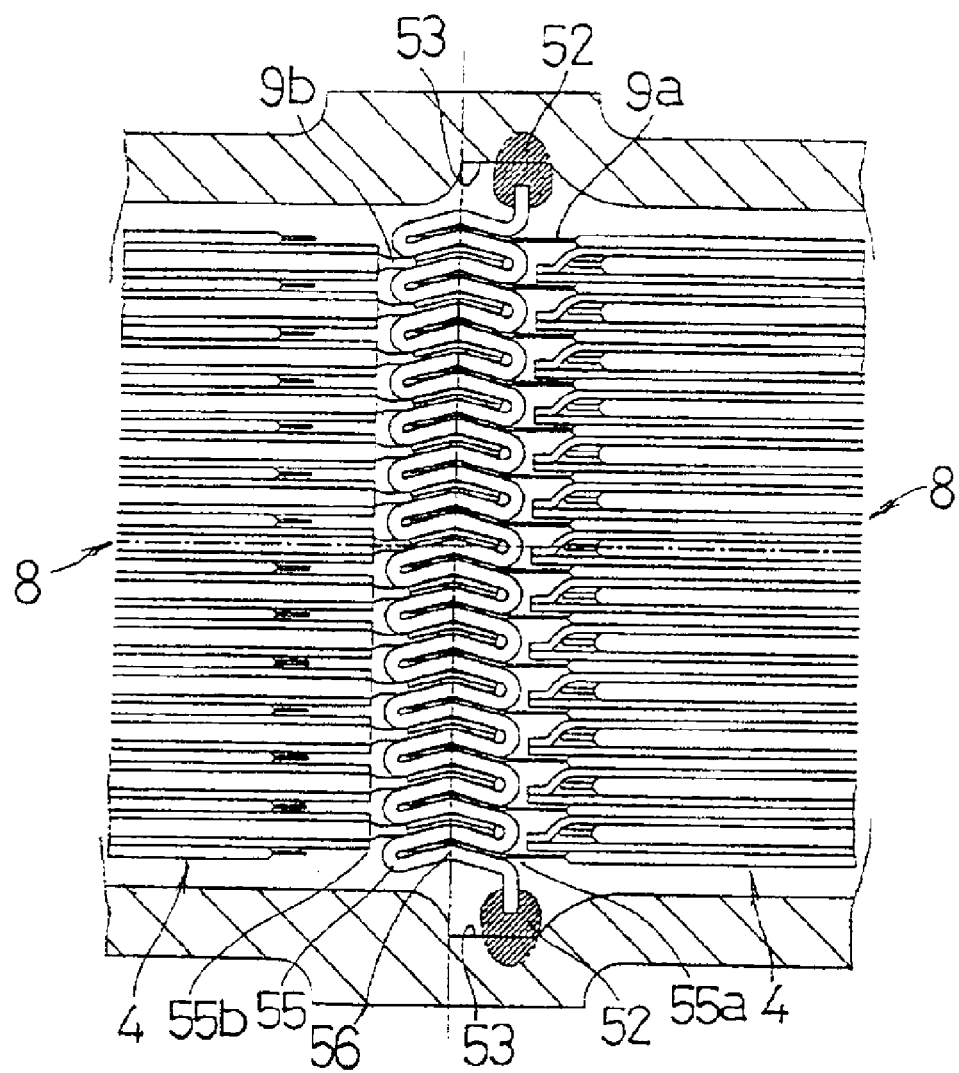
FIG. 13 is a horizontal cross-sectional view showing the adjacent region of a separation wall in accordance with a sixth embodiment of the prismatic battery module of the invention.

As shown in FIG. 13, this embodiment employs a corrugated connector plate 55 to serve as an electroconductive connector. The corrugated connector plate 55 is connected to the lead portions 9a and 9b by inserting the lead portions 9a and 9b of the positive and the negative electrode plates of the electrode plate group 8 into respective troughs 55a and 55b and then applying pressure to form a bent 56 in the corrugation. The seal rubber 52 is fixedly baked to either side edge of the corrugated connector plate 55, and the seal slot 53 for receiving the seal rubber 52 is formed in the inner surface of each side wall of the prismatic battery case 3 at a position to install the corrugated connector plate 55.

The embodiment, in which the corrugation of the corrugated connector plate 55 includes the bent 56, is advantageous not only in that the corrugated connector plate 55 is made more rigid in the direction in which the trough 55a and 55b open but also in that the contact area between the lead portions 9a or 9b and the connector plate 55 is increased by applying a relatively small pressure so as to reduce the resistance.

Figure 14:
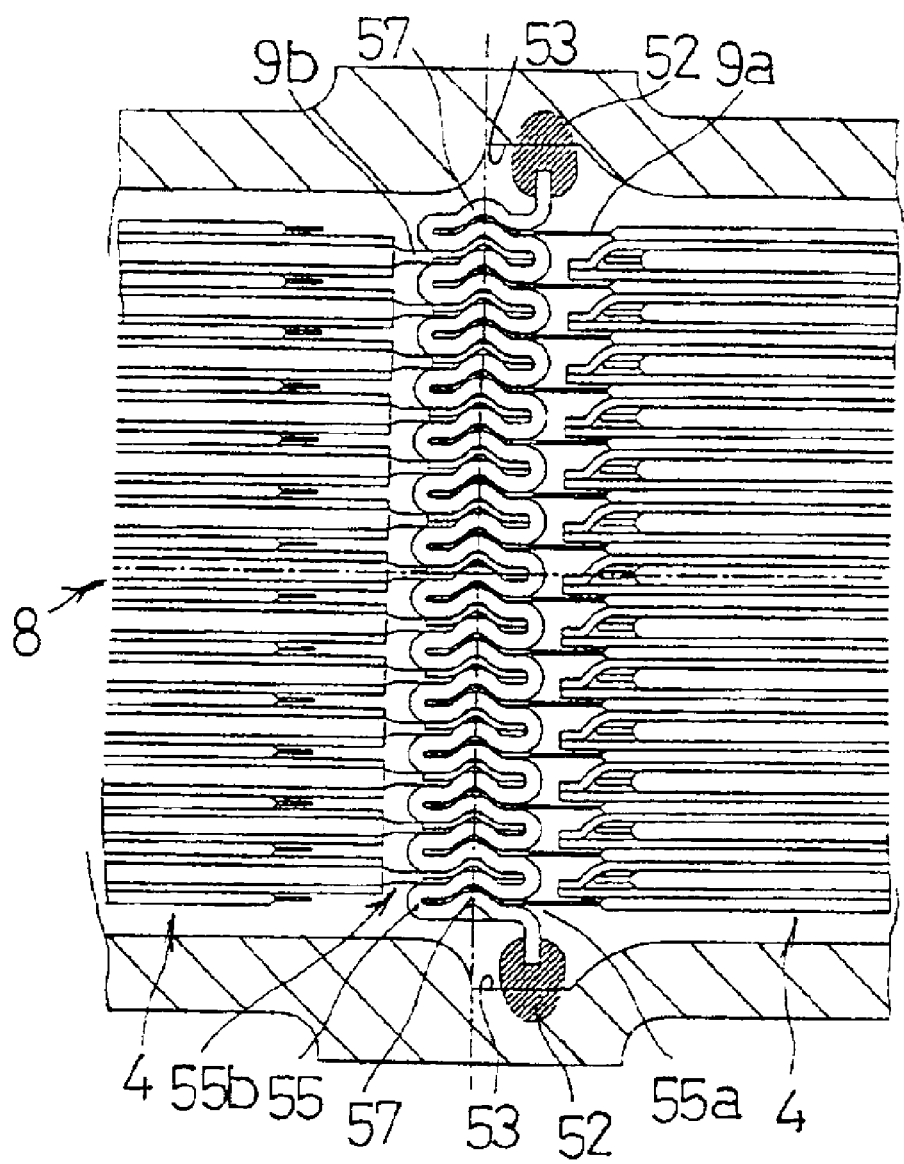
FIG. 14 is a horizontal cross-sectional view showing the adjacent region of a separation wall in a variation of the sixth embodiment.

Referring to FIG. 14, a variation of this embodiment is shown in which the corrugation is pressed to form a ridge 57 for the connection of the corrugated connector plate 55 with the lead portions 9a and 9b. The ridge 57 serves to provide the same effects due to its shape and serves to reduce the resistance.

[Seventh Embodiment]

Next, a seventh embodiment of the prismatic battery module of the invention is described with reference to FIGS. 15A through 15C and 16.

Figure 15A:
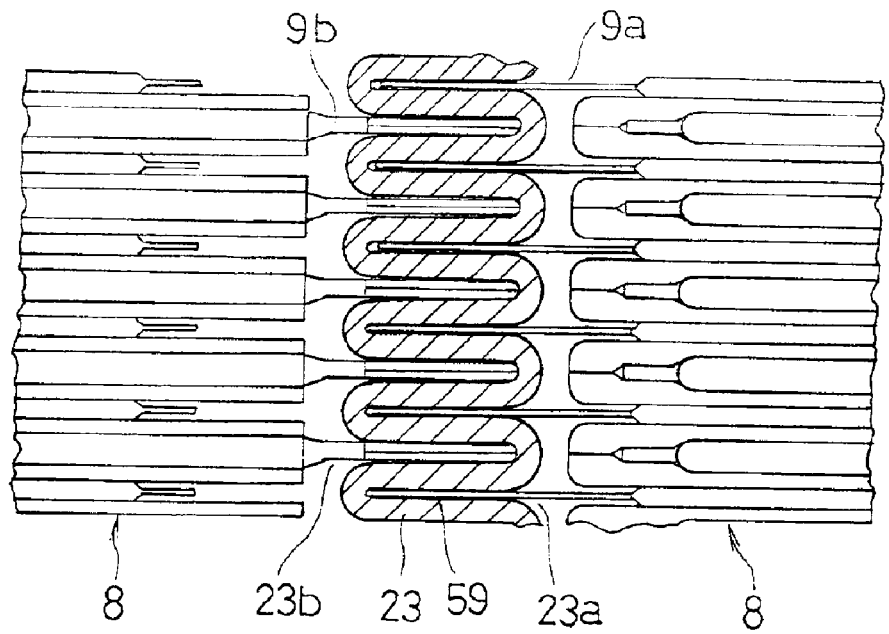
FIG. 15A is a partial horizontal cross-sectional view showing a connection between a corrugated connector plate and an electrode plate group in accordance with a seventh embodiment of the prismatic battery module of the invention.
Figure 15B:
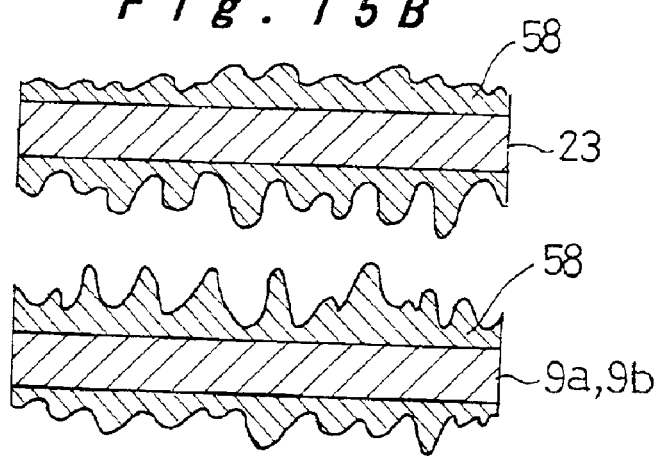
FIG. 15B is an enlarged schematic view showing a part of the connector plate and the electrode plate group prior to connection.
Figure 15C:
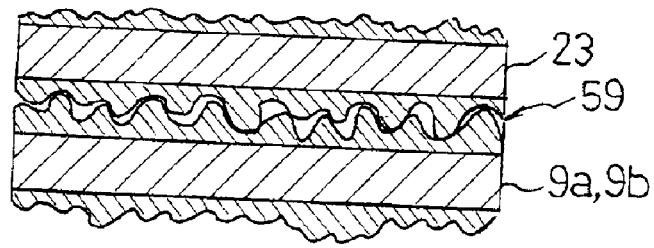
FIG. 15C is an enlarged schematic view showing a part of the connector plate and the electrode plate group connected to one another.

In this embodiment, a coarse plating 58 having a surface roughness of about 5 μm is applied to the surfaces of either or both of the troughs 23a, 23b and the lead portions 9a, 9b in the connection between the electrode plate group 8 and the corrugated connector plate 23 as shown in FIG. 15B. By compressing the corrugated connector plate 23 with the lead portions 9a and 9b positioned in the troughs 23a and 23b, respectively, the surfaces having the coarse plating 58 are brought into contact with each other to form an adhesion layer 59, as can be seen in FIGS. 15A through 15C. In this manner, joints with a large contact area are formed and a further reduction in resistance is achieved. In this embodiment, it is preferred that the coarse plating 58 be Ni-based plating in order to prevent corrosion caused by an electrolyte.

Figure 16:
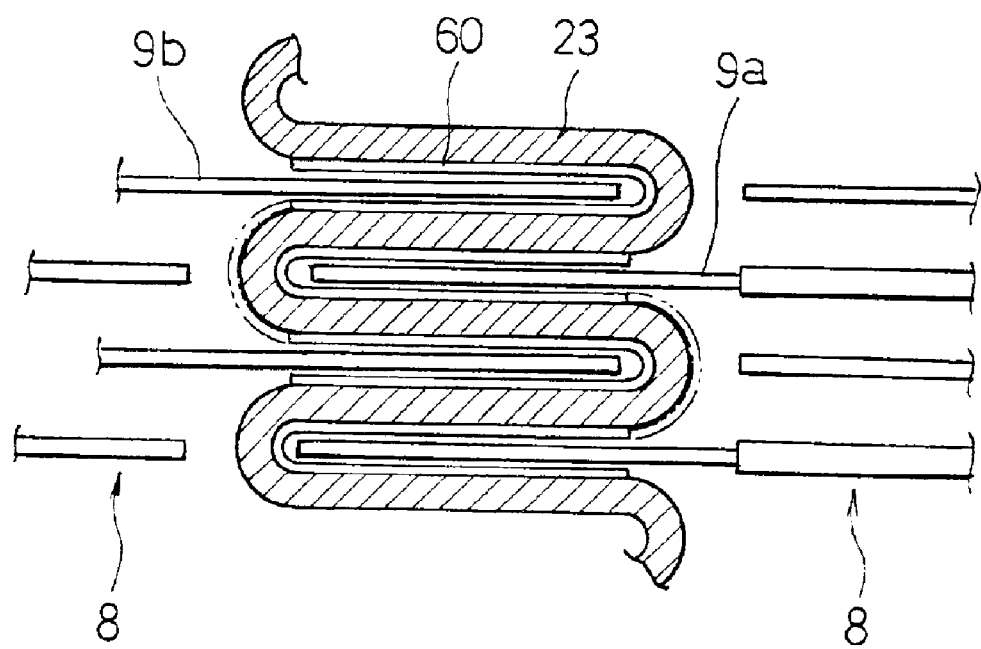
FIG. 16 is a partial horizontal cross-sectional view showing a connection between the corrugated connector plate and the electrode plate group in a variation of the seventh embodiment.

Referring to FIG. 16, a variation of the above-described embodiment uses an electroconductive soft material 60 between the surfaces of troughs 23a and 23b of the corrugated connector plate 23 and the respective lead portions 9a and 9b of the electrode plates. The similar resistance-reducing effects are obtained with this construction. It should be appreciated that the electroconductive soft material 60 may be provided in a continuous form as indicated by the phantom line in the drawing.

[Eighth Embodiment]

Figure 17:
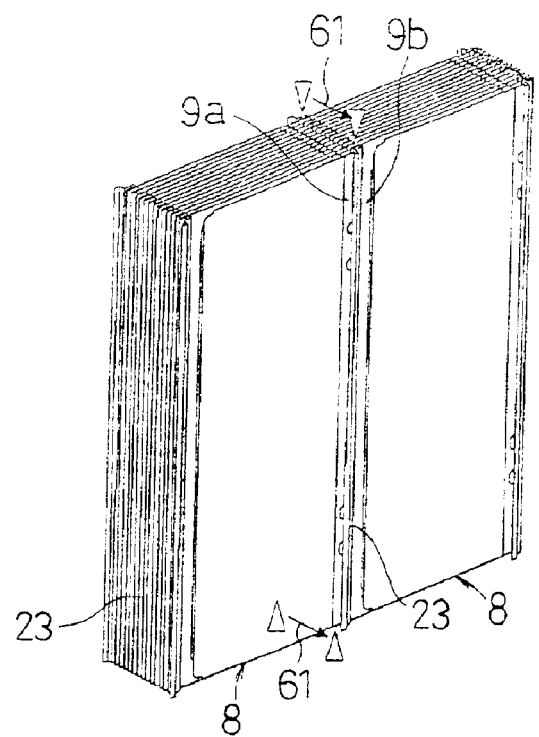
FIG. 17 is a perspective view showing a connection process of the corrugated connector plate and the electrode plate group in accordance with an eighth embodiment of the prismatic battery module of the invention.
Figure 18:
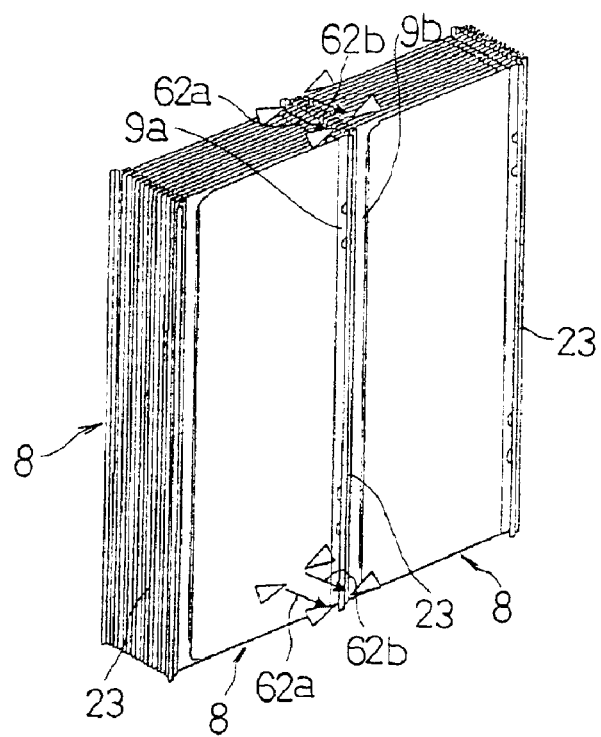
FIG. 18 is a perspective view showing a connection process of the corrugated connector plate and the electrode plate group in a variation of the eighth embodiment.

Next, an eighth embodiment of the prismatic battery module of the invention is described with reference to FIGS. 17 and 18.

In this embodiment, an electron beam or laser light is irradiated to form a joint between the corrugated connector plate 23 and the lead portions 9a and 9b of the electrode plates of the electrode plate group 8 that are positioned in the respective troughs 23a and 23b of the connector plate 23, both at the top end and at the bottom end of the connector plate, thereby welding the lead portions 9a and 9b to the corrugated connector plate 23. In the construction shown in FIG. 17, the beam is shone vertically and scans along the welding lines 61, that is, along the width of the corrugated connector plate 23, both at the top and at the bottom of the corrugated connector plate 23, whereas, in the construction shown in FIG. 18, the beam is shone horizontally from both sides of the connector plate 23, that is, along the directions leading from the electrode plate groups 8 toward the connector plate 23, and scans along the welding lines 62a and 62b, that is, along the width of the corrugated connector plate 23, to connect ends of the corrugated connector plate 23 with respective ends of the lead portions 9a and 9b of the electrode plates.

This embodiment achieves stable connection as well as a reduced resistance since the ends of the lead portions 9a and 9b are welded to the corrugated connector plate 23. Also, the number of steps involved in the connecting process is reduced by providing welding in the vertical direction at the both ends of the corrugated connector plate 23 as described in reference with FIG. 17, since the number of welds can be as small as two in this manner. Although the number of the welds can be greater, the corrugated connector plate 23 is properly welded to the lead portions 9a and 9b even when there is a difference in height between the corrugated connector plate 23 and the lead portions 9a and 9b by welding the ends of the corrugated connector plate 23 to the respective ends of the lead portions 9a and 9b of the electrode plates from both sides, that is, along the directions leading from the electrode plate groups 8 toward the connector plate 23, as described in reference to FIG. 18.

[Ninth Embodiment]

Next, a ninth embodiment of the prismatic battery module of the invention is described with reference to FIGS. 19 and 20.

Figure 19:
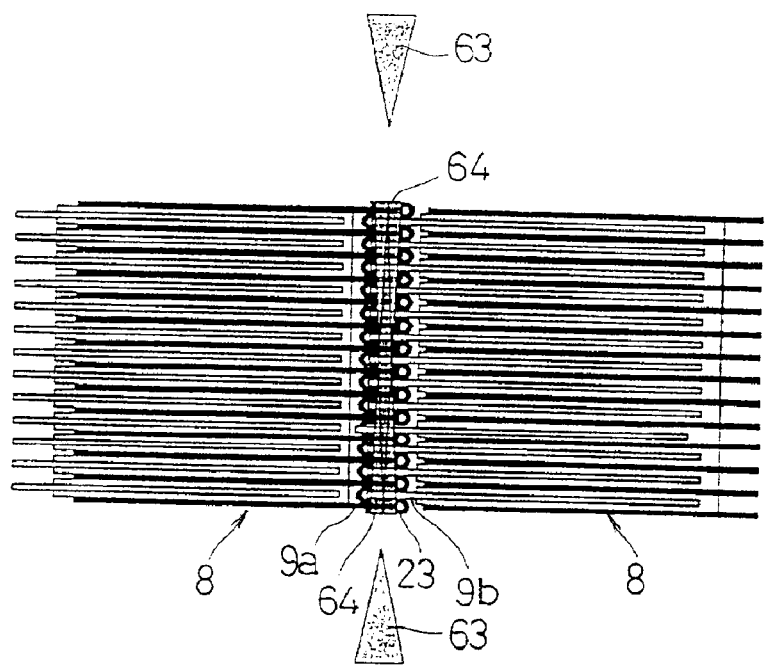
FIG. 19 is a horizontal cross-sectional view showing a connection process of the corrugated connector plate and the electrode plate group in accordance with a ninth embodiment of the prismatic battery module of the invention.

Referring first to FIG. 19, an electron beam or laser light is irradiated onto the corrugated connector plate 23 in the direction along which the plates are stacked in the electrode plate group 8, penetrating into the connector plate 23. As a result, a through weld 64 is formed, which connects the corrugated connector plate 23 with the lead portions 9a and 9b of the electrode plates. The through weld 64 is formed in line or spots spaced apart from one another along the longitudinal direction of the corrugated connector plate 23. By allowing the through welds 64 to penetrate into the corrugated connector plate 23 from both sides to a depth greater than half the width of the corrugated connector plate 23, the lead portions 9a and 9b of each electrode plate are connected to the corrugated connector plate 23.

This embodiment, in which the lead portions 9a and 9b are connected to the corrugated connector plate 23 in their intermediate regions, is advantageous in that the welds provide a stable connection, forming a short electrical communication path, which enables further reduction of resistance.

Figure 20:
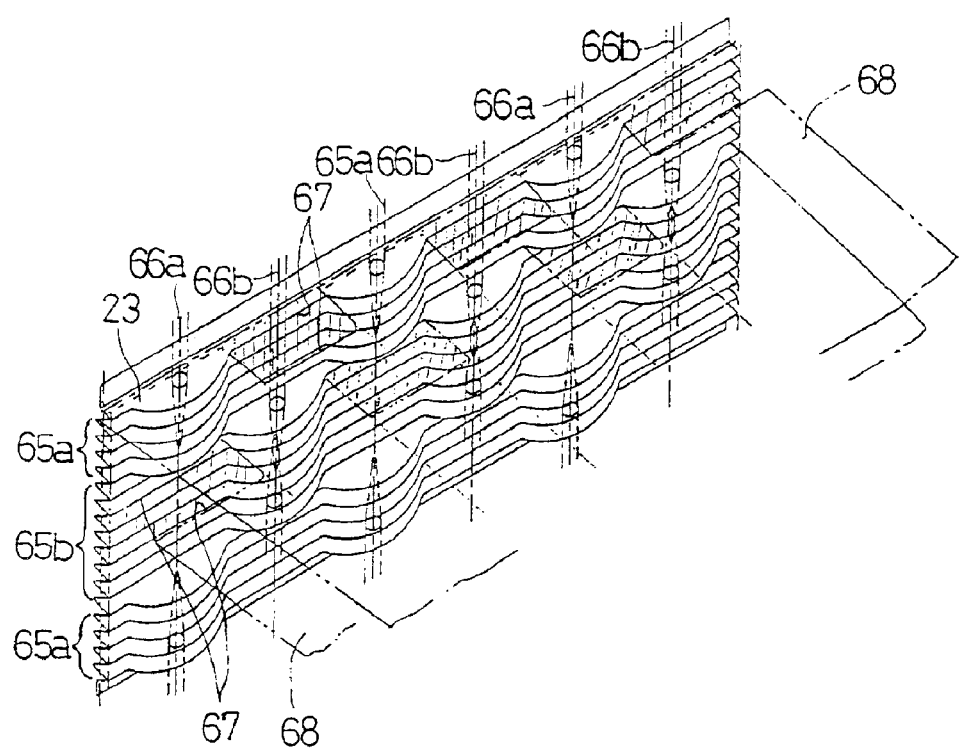
FIG. 20 is a perspective view showing a connection process of the corrugated connector plate and the electrode plate group in a variation of the ninth embodiment.

Referring to FIG. 20, a variation of the above-described embodiment is shown which utilizes the through welds 64 with the penetration depth less than half the width of the corrugated connector plate 23. The lead portions 9a and 9b are welded to the corrugated connector plate 23 at longitudinally spaced-apart positions. The welds are provided in separate weld groups 66a and 66b, so that the welds in the weld group 66a are formed in welding ranges 65a and the welds in the weld group 66b are formed in welding ranges 65b, which have different positions from the welding ranges 65a in the direction along which the electrode plates are stacked in the electrode plate group 8. A series of cutouts 67 are formed on both the corrugated connector plate 23 and each electrode plate 68 so that, in each of the weld groups 66a and 66b, the electron beam or laser light proceeds without being interrupted outside the welding ranges 65a and 65b. In the example shown, the same electrode plates 68 are used but are inverted for those arranged in the welding range 65a and for those arranged in the welding range 65b.

In this manner, proper welding is accomplished to achieve the above-described advantages, even in cases where the irradiation of the electron beam or laser light from both sides is not sufficient to provide enough penetration to reach the center of the corrugated connector plate 23 in the direction along which the electrode plates are stacked, to ensure stable welding.

[Tenth Embodiment]

Figure 21A:
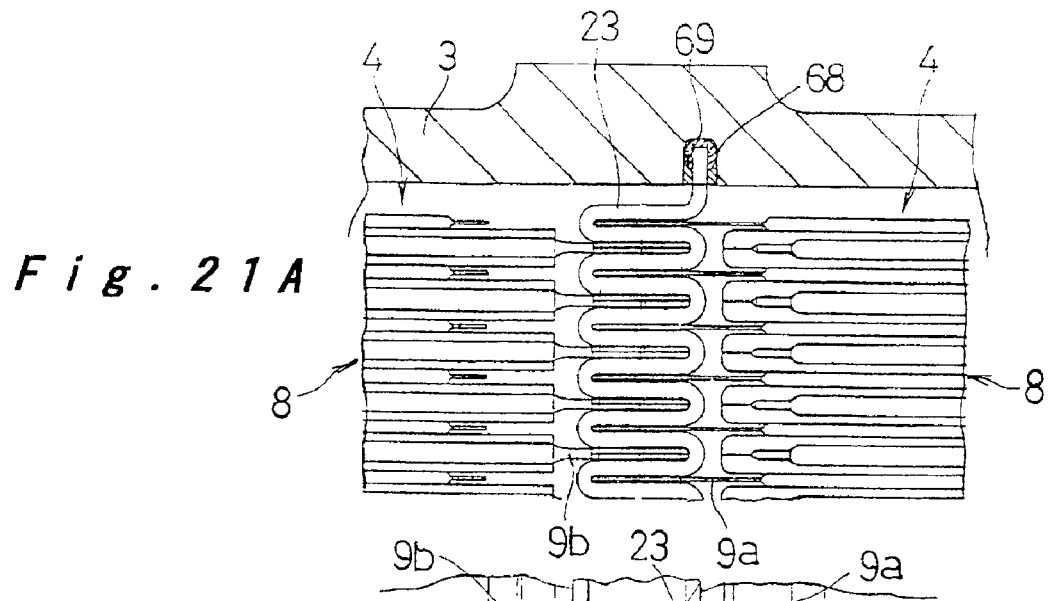
FIG. 21A is a partial horizontal cross-sectional view showing a connection between a prismatic battery case and the corrugated connector plate and the electrode plate group in accordance with a tenth embodiment of the prismatic battery module of the invention.
Figure 21B:
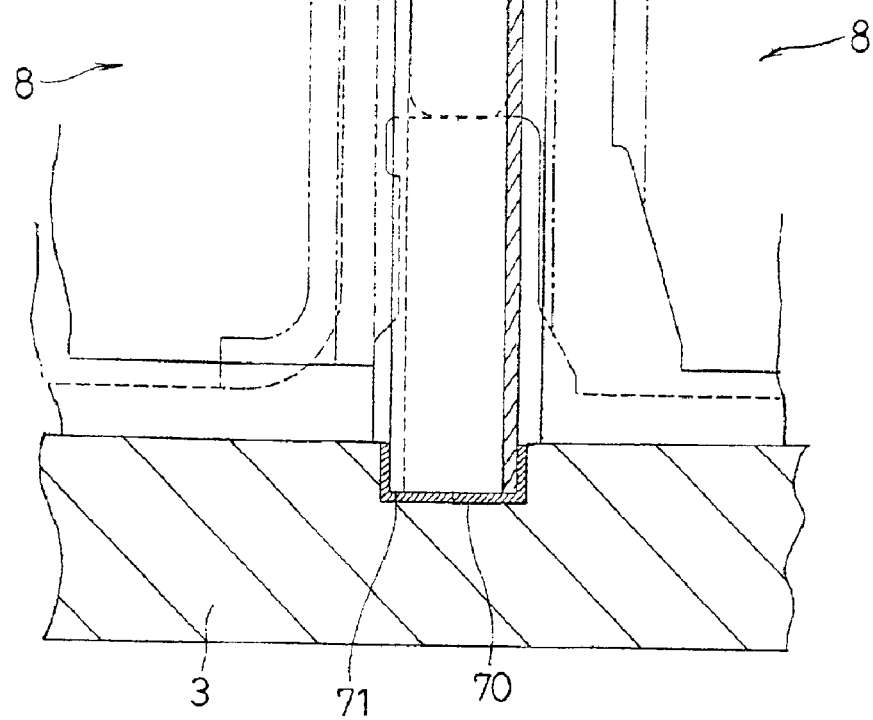
FIG. 21B is a vertical cross-sectional front view showing the connection between the prismatic battery case and the corrugated connector plate and the electrode plate group in accordance with the tenth embodiment.

Next, a tenth embodiment of the prismatic battery module of the invention is described with reference to FIGS. 21A and 21B.

In this embodiment, a plurality of the electrode plate groups 8 are connected to one another via the corrugated connector plates 23 to form a connected body, which is then placed in the prismatic battery case 3. A seal rubber 68 is fixedly baked to either side edge of the corrugated connector plate 23 and is fitted, while compressed, in a slot 69 formed on the side walls of the prismatic battery case 3 to provide a seal between the adjacent cell cases 4. The bottom edge of the corrugated connector plate 23 is placed in a slot 70 formed in the bottom inner surface of the prismatic battery case 3 and is embedded in a pitch 71 that fills the slot as a sealing material in order to provide sealing. The same sealing structure is provided between the top edge of the corrugated connector plate 23 and the lid 6. Instead of using the seal rubber 68, sealing may be provided at the side edges of the corrugated connector plate 23 by the pitch 71 placed in the slot 69.

This embodiment assures the efficient production of the prismatic battery module since sealing is provided between the edges of the corrugated connector plate 23 and the inner walls of the prismatic battery case 3 by simply inserting the connected body, composed of the electrode plate groups 8 and the corrugated connector plate 23 connected to one another, into the prismatic battery case 3.

[Eleventh Embodiment]

Next, an eleventh embodiment of the prismatic battery module of the invention is described with reference to FIGS. 22A and 22B.

Figure 22A:
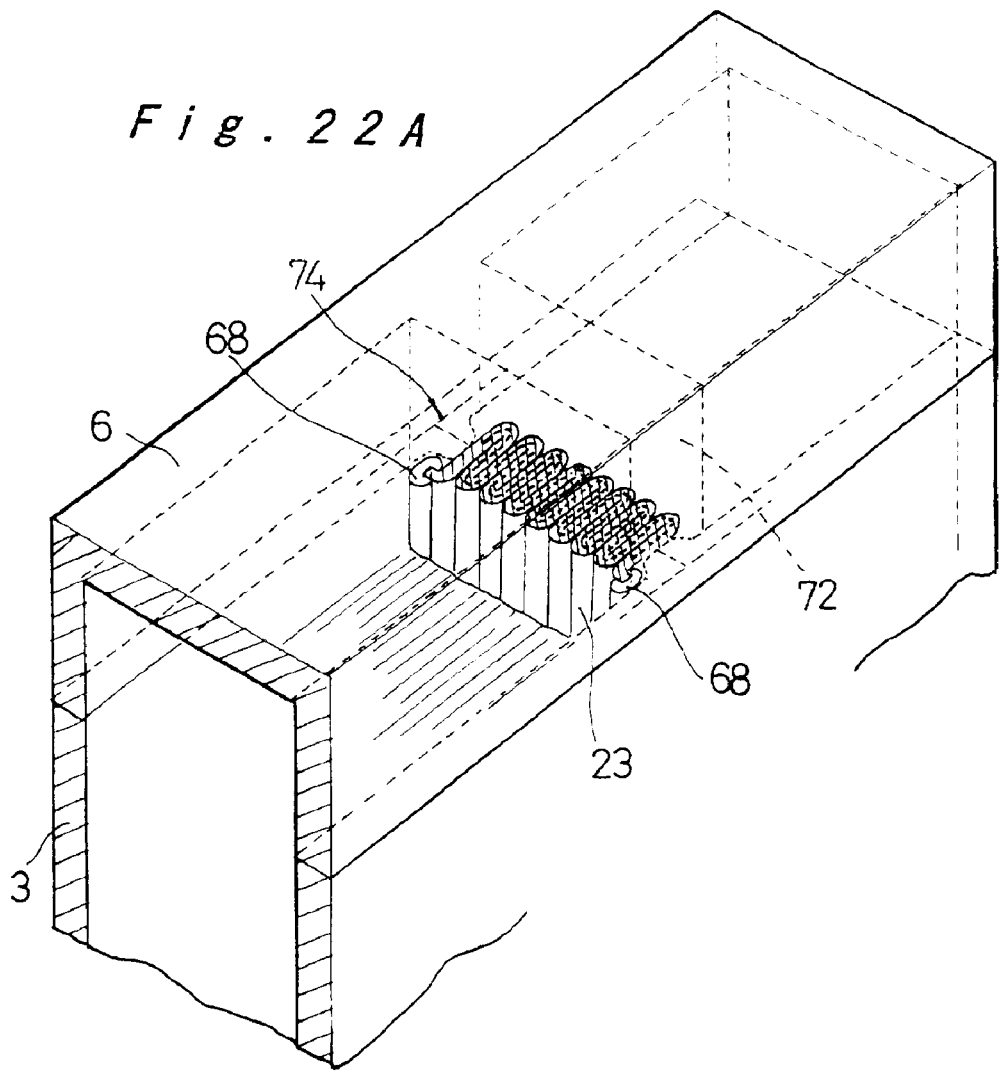
FIG. 22A is a perspective view showing a connection between a lid of the prismatic battery case and the upper end of the corrugated connector plate in accordance with an eleventh embodiment of the prismatic battery module of the invention.
Figure 22B:
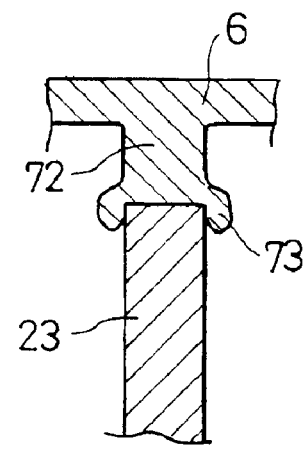
FIG. 22B is a vertical cross-sectional view showing the connection between the lid of the prismatic battery case and the upper end of the corrugated connector plate in the eleventh embodiment.

Referring to FIG. 22A, a vertical sealing wall 72 is formed in the lid 6 at a position opposite to the corrugated connector plate 23. The lid 6 is placed on top of the prismatic battery case 3 to cover the upper opening thereof. When the prismatic battery case 3 is joined to the lid 6, the lower end of the sealing wall 72 is heat-melted by a heat plate and is pressed against the upper end of the corrugated connector plate 23 until a flash 73 forms. In this manner, sealing is provided between the prismatic battery case 3 and the lid 6. In order to provide reliable sealing, the flash 73 is properly formed by constructing the portion of the sealing wall 72 to be melted larger as compared to the remainder of the lid 6.

As in the case of the tenth embodiment, the bottom edge of the corrugated connector plate 23 is placed in a slot 70, which is formed in the bottom inner surface of the prismatic battery case 3 and is filled with the pitch 71 as a seal material, to provide seal.

In this embodiment, seal is provided along a seal line 74, shown as the broken line in FIG. 22A that extends along the upper edge of the corrugated connector plate 23. This assures the efficient production of the prismatic battery module and makes it possible to establish seal without fixedly baking the seal rubber to the top end of the corrugated connector plate 23 in a liquid-tight manner. When the seal rubber is fixedly baked, its margin of compression depends upon the margin of the attachment between the prismatic battery case 3 and the lid 6. For this reason, it is difficult to control the margin of compression in such cases, which makes it difficult to obtain stable sealing. This embodiment is also effective in alleviating this problem.

When pressure builds up in the cell case, the lid 6 tends to deform downward as the side walls of the cell case expand outward. The sealing wall 72 of the lid 6 of the present embodiment and the resilient corrugated connector plate 23 effectively cooperate to substantially prevent the deformation of the cell case.

[Twelfth Embodiment]

Figure 23A:
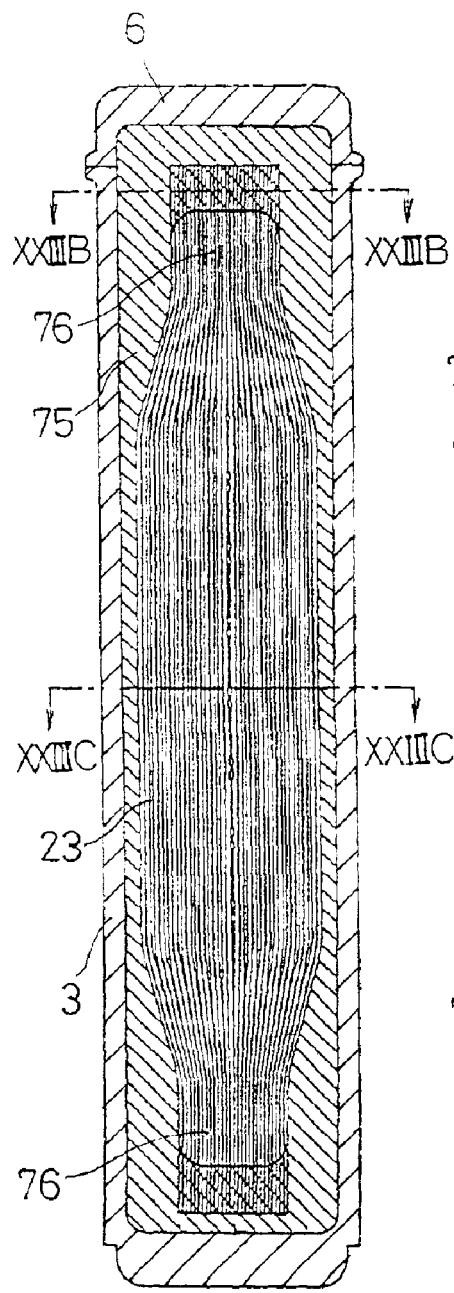
FIG. 23A is a vertical cross-sectional side view showing a sealing structure between the prismatic battery case and edges of the corrugated connector plate in accordance with a twelfth embodiment of the prismatic battery module of the invention.
Figure 23B:
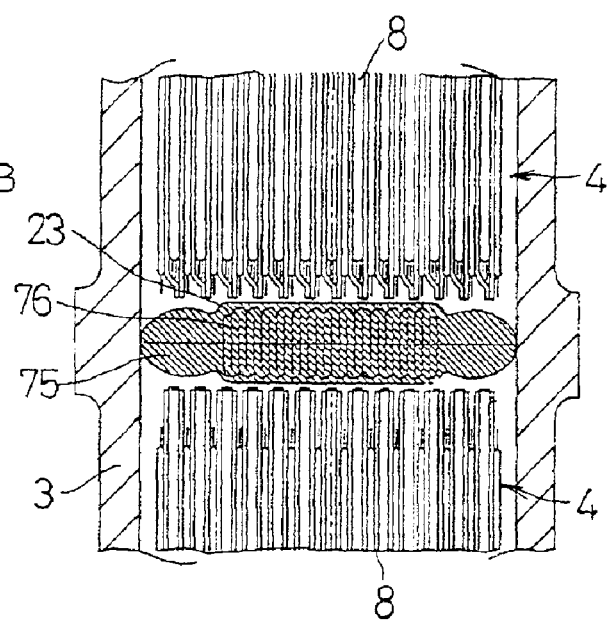
FIG. 23B is a cross-sectional view taken along a line XXIIIB—XXIIIB in FIG. 23A.
Figure 23C:
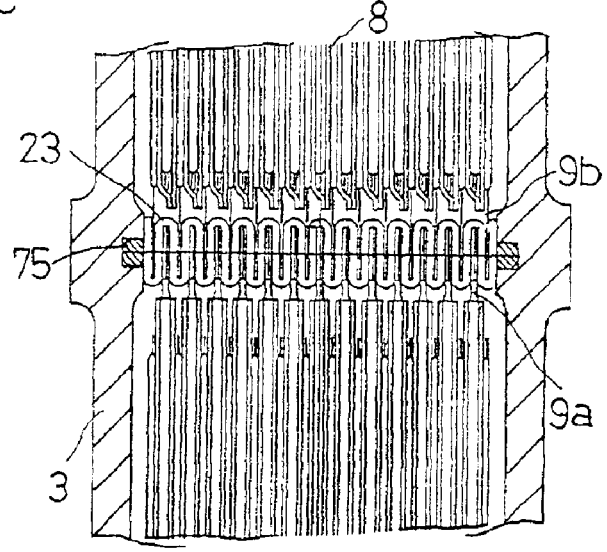
FIG. 23C is a cross-sectional view taken along a line XXIIIC—XXIIIC in FIG. 23A.

Next, a twelfth embodiment of the prismatic battery module of the invention is described with reference to FIGS. 23A through 23C.

In this embodiment, a seal rubber 75 is fixedly baked over the entire periphery of the corrugated connector plate 23. The periphery of the seal rubber 75 is pressed against the inner walls of the prismatic battery case 3 and the lid 6 to provide sealing between the adjacent cell cases 4. As can be seen in FIG. 23B, the corrugated connector plate 23 is compressed to bring each corrugation into contact with each other both at the top end and at the bottom end thereof that are outside the region of the corrugated connector plate 23 that has the lead portions 9a and 9b inserted thereinto. The seal rubber 75 is fixedly baked to cover the compressed portions 76.

This embodiment is advantageous in that the resilience of the seal rubber 75 provides a sufficient sealing pressure, thereby simplifying the insertion/assembly process of the corrugated connector plate 23 into the prismatic battery case 3. The construction, in which the top and the bottom ends of the corrugated connector plate 23 are compressed and the seal rubber 75 is fixedly baked to cover the compressed portions, achieves improved sealing performance, which in turn improves the workability.

While in this embodiment, the seal rubber 75 is fixedly baked over the entire periphery of the corrugated connector plate 23, only part of the periphery may be sealed by using other sealing materials such as pitch.

[Thirteenth Embodiment]

Next, a thirteenth embodiment of the prismatic battery module of the invention is described with reference to FIGS. 24A through 26B.

Figure 24A:
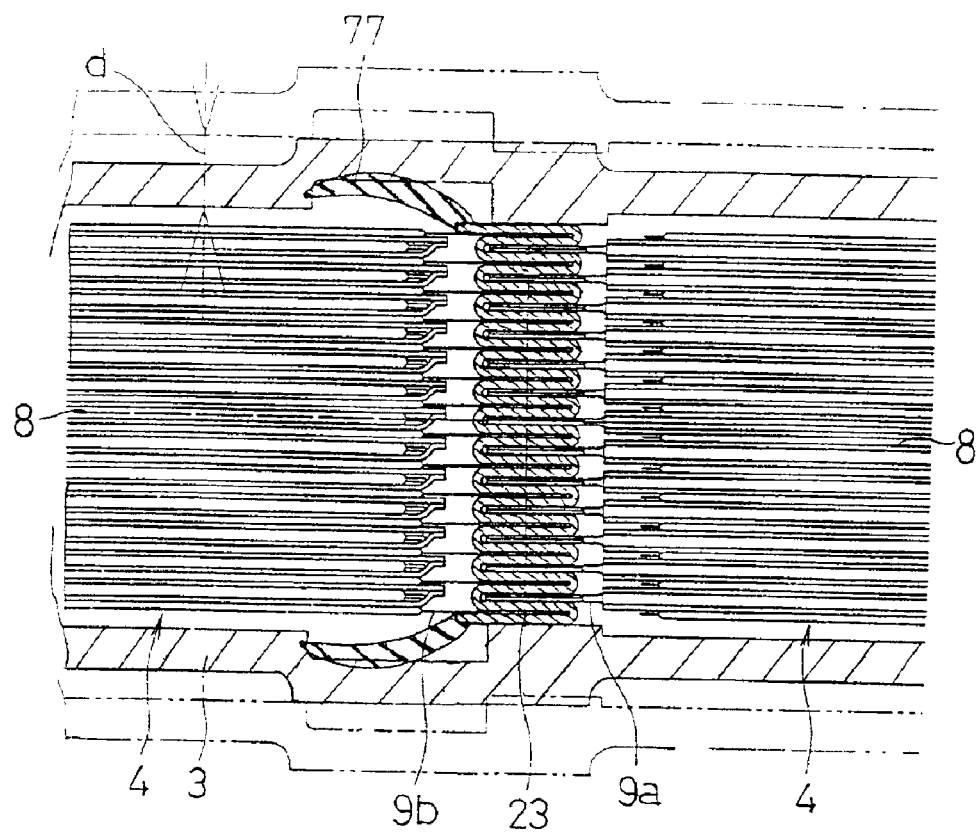
FIG. 24A is a horizontal cross-sectional view showing a sealing structure between the prismatic battery case and edges of the corrugated connector plate in accordance with a thirteenth embodiment of the prismatic battery module of the invention, in a normal state.
Figure 24B:
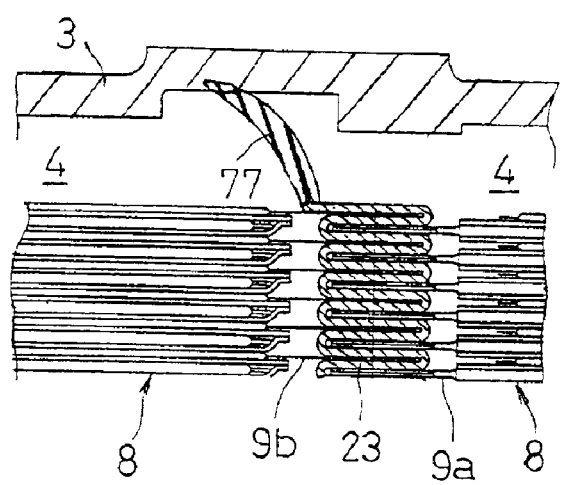
FIG. 24B is a horizontal cross-sectional view showing the sealing structure in an expanded state.
Figure 25:
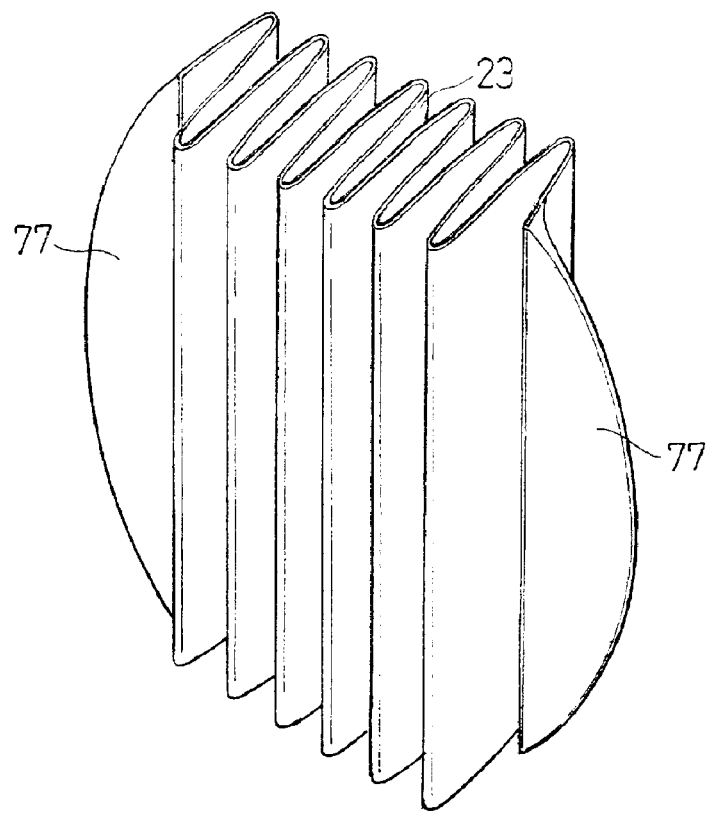
FIG. 25 is a perspective view showing the corrugated connector plate of the thirteenth embodiment.

Referring to FIGS. 24A and 24B, a resilient seal portion 77 is formed on either side of the corrugated connector plate 23. As shown in FIG. 25, the resilient seal portion 77, which has a resilience and tends to expand outward, has a width that has the largest value at its center in the vertical direction and gradually decreases toward the top and the bottom ends thereof.

As indicated by the phantom line in FIG. 24A, the side wall of the prismatic battery case 3 can be displaced outward by as much as a distance d (2 to 3 mm at most) as the electrode plate group 8 expands or contracts upon charging/discharging of the battery. When this happens, the resilient seal portion 77 follows the side wall and remains in contact with the prismatic battery case 3. Accordingly, the seal between the cell cases 4 is maintained. When the prismatic battery case 3 expands, the side walls expands most at the central region thereof in the vertical direction, which is the most distant region from the bottom wall and the lid of the prismatic battery case 3 that provides confinement for the side walls. Since the resilient seal portion 77 has a width that has the largest value at its center in the vertical direction and gradually decreases toward the top and the bottom ends thereof, it expands most at the center to follow the shape of the expanded prismatic battery case 3. Consequently, the resilient seal portion 77 effectively provides sealing between the cell cases 4 over the vertical length thereof.

Figure 26A:
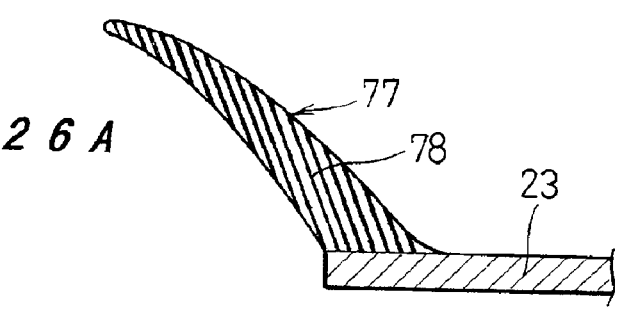
FIG. 26A is a horizontal cross-sectional view showing another construction of the resilient seal portion of the thirteenth embodiment.
Figure 26B:
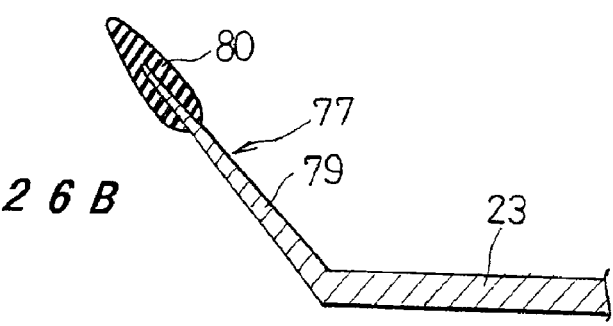
FIG. 26B is a horizontal cross-sectional view showing still another construction of the resilient seal portion of the thirteenth embodiment.

As shown in FIGS. 26A and 26B, the resilient seal portion 77 may be configured to have a cross-section with its width decreasing toward the edge thereof. In this manner, the ability of the resilient seal portion 77 to follow the side wall, as well as its sealing performance, is improved. The resilient seal portion 77 may include a rubber piece 78 fixedly baked to the corrugated connector plate 23 at either side edge thereof, as shown in FIG. 26A. Alternatively, it may include a metal plate 79, which may be integrally formed with the corrugated connector plate 23 or may be secured to the corrugated connector plate 23 on either edge, and a rubber 80 fixedly baked to the edge of the metal plate 79, as shown in FIG. 26B.

[Fourteenth Embodiment]

Next, a fourteenth embodiment of the prismatic battery module of the invention is described with reference to FIGS. 27A and 27B.

Figure 27A:
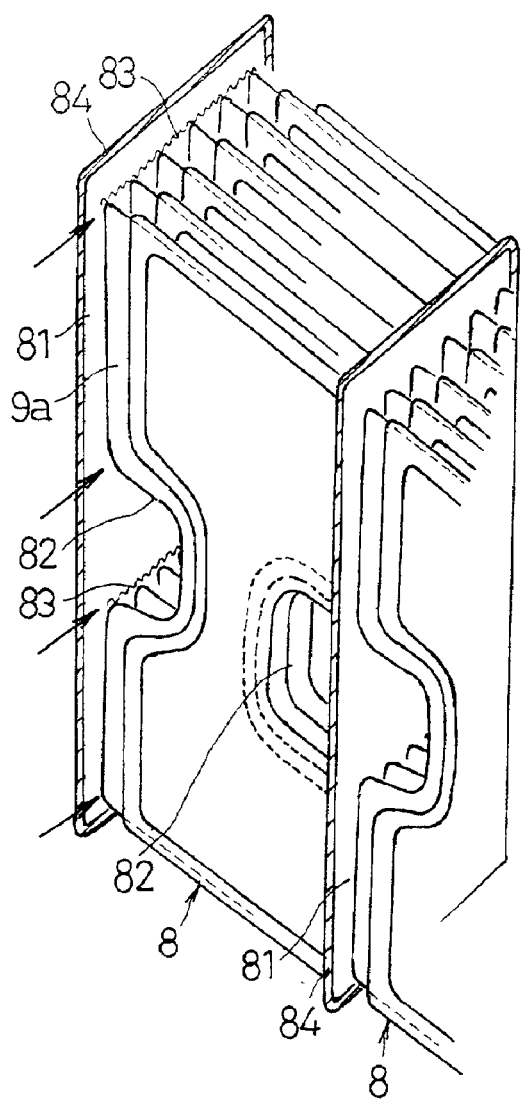
FIG. 27A is a perspective view showing a connection process between the connector plate and the electrode plate group in accordance with a fourteenth embodiment of the prismatic battery module of the invention.
Figure 27B:
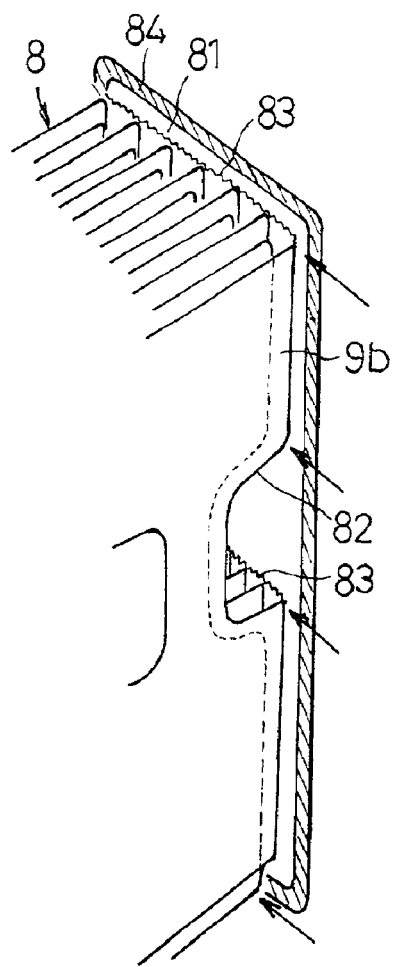
FIG. 27B is a perspective view as viewed in the opposite direction.

Referring to FIGS. 27A and 27B, the lead portions 9a and 9b of the electrode plates of the electrode plate group 8 are welded to a planar connector plate 81 on either side thereof. The planar connector plate 81 is not integrally formed with the prismatic battery case 3 by insert molding. In particular, one or more of cutouts 82 are formed on the electrode plates of the adjacent electrode plate groups 8 on the sides facing the planar connector plate 81. The intersecting points between both ends of the lead portions 9a and 9b and the planar connector plate 81, as well as between each corner of the cutout 82 and the planar connector plate 81, are fillet-welded to form welds 83, which connect the electrode plate group 8 with the planar connector plate 81. A sealing material 84 such as a fixedly baked rubber or other material is arranged over the periphery of the planar connector plate 81 to provide sealing between the connector plate 81 and the inner surface of the prismatic battery case 3 and thus seal the cell cases 4 from one another.

Using the separate planar electroconductive connector from the prismatic battery case 3, this embodiment facilitates manufacture of the prismatic battery module and thus reduces the production cost. It also helps reduce the resistance of the connection since the lead portions 9a and 9b of the electrode plates of the electrode plate group 8 are connected to the planar connector plate 81 through three, four, or more of the welds 83.

[Fifteenth Embodiment]

Next, a fifteenth embodiment of the prismatic battery module of the invention is described with reference to FIGS. 28 to 30.

Figure 28:
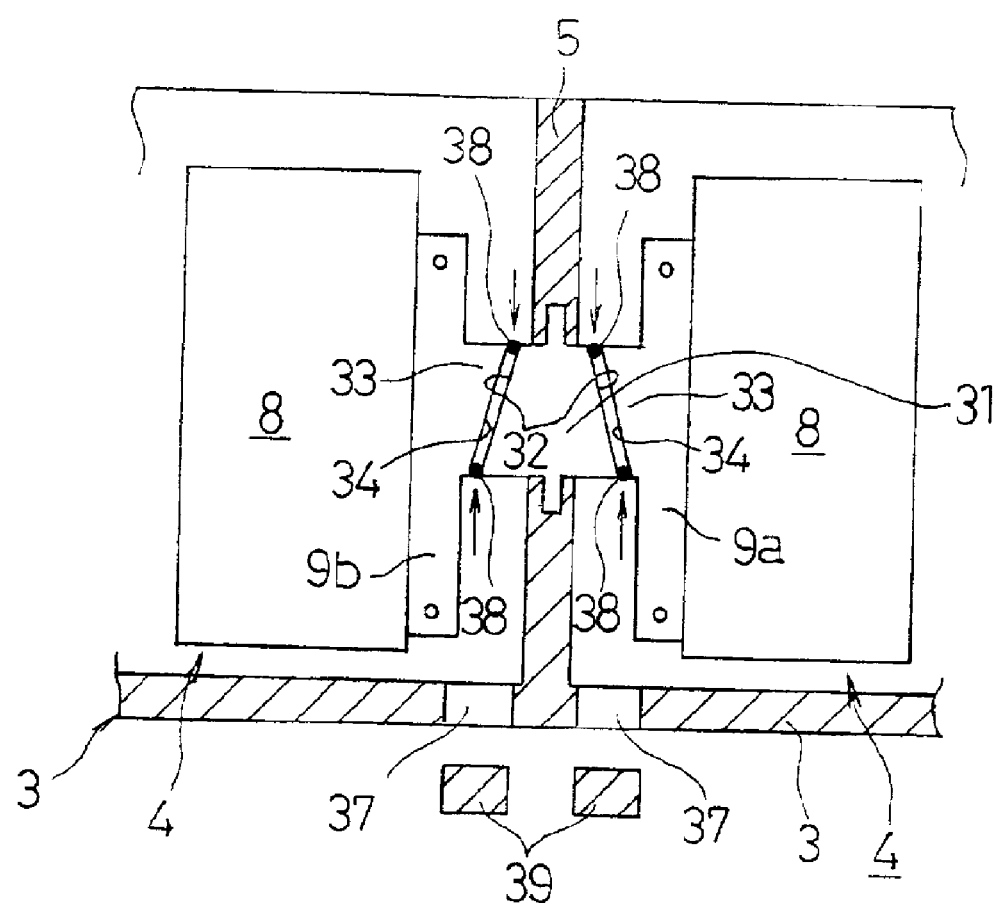
FIG. 28 is a vertical front view showing the adjacent region of a separation wall in accordance with a fifteenth embodiment of the prismatic battery module of the invention.
Figure 29A:
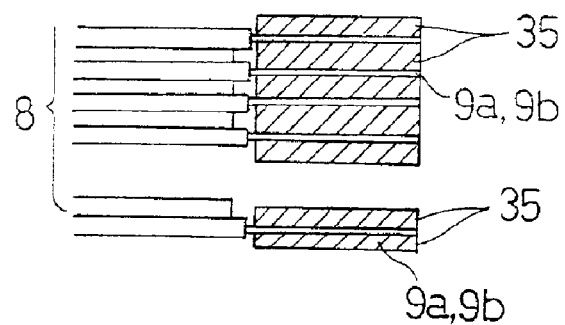
FIG. 29A is a horizontal cross-sectional view showing lead portions of the electrode plate group in the fifteenth embodiment.
Figure 29B:
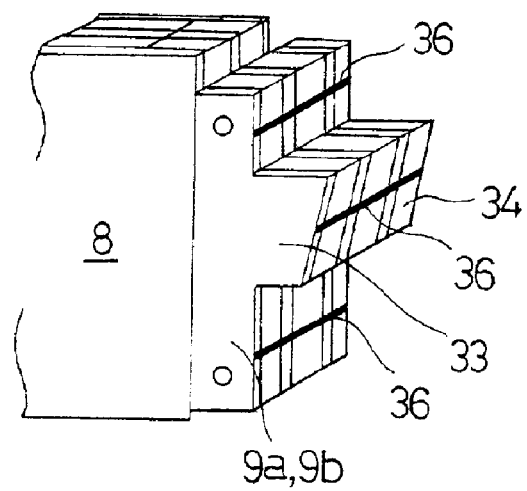
FIG. 29B is a perspective view showing the lead portions of the electrode plate group in accordance with the fifteenth embodiment.

Referring to FIG. 28, a block electroconductive connector 31 is integrally formed with the separation wall 5, which is arranged between the cell cases 4 of the prismatic battery case 3, at the substantially central portion of the separation wall 5 by insert molding. The electroconductive connector 31 includes a raised portion that projects into the cell case 4 on either side and has a tapered connection surface 32, which comes close to the other connection surface 32 in a tapered fashion as it extends upward. As shown in FIGS. 29A and 29B, a raised portion 33 is formed in the lead portions 9a and 9b of the electrode plate group 8 at the central portion thereof. The raised portion 33 corresponds to the raised portion of the electroconductive connector 31 and includes a sloped surface 34 that comes in surface contact with the tapered connection surface 32. With electroconductive spacers 35 interposed between them, the lead portions 9a and 9b of the electrode plate group 8 are welded together by, for example, beam weld 36, so that they together form a block.

The electrode plate group 8 is placed in each cell case 4 of the prismatic battery case 3 so that the sloped surfaces 34 of the raised portion 33 of the lead portions 9a and 9b come into surface contact with the respective tapered connection surfaces 32 of the electroconductive connector 31 projecting from the separation wall 5. A laser beam is irradiated through the upper opening of the cell case 4 and a work opening 37 formed on the bottom of the cell case 4 onto the upper and the lower sides of the contact surface between the tapered connection surface 32 and the sloped surface 34 to form a laser beam weld 38. As a result, the row of the electrode plate groups 8 in the respective cell cases 4 are interconnected in series via the electroconductive connectors 31. After welding has been completed, the work opening 37 is closed by plugging a resin plate 39 thereinto and heat-melting the resin plate. An electrolyte is then poured into the cell cases 4.

This embodiment, in which the raised portions 33 of the lead portions 9a and 9b of the electrode plate group 8 are welded to the electroconductive connector 31 integrally formed with the separation wall 5, provides reliable connection between the electrode plates of the electrode plate group 8 and the electroconductive connector 31. Furthermore, the connection between the electroconductive connector 31 and the lead portions 9a and 9b is made even more reliable and the resistance of the connection is further reduced since the electroconductive connector 31 includes the tapered connection surfaces 32, which is exposed within the cell case 4, and the raised portion 33 of the lead portions 9a and 9b includes the sloped surface 34 to come into contact with the tapered connection surfaces 32.

Figure 30:
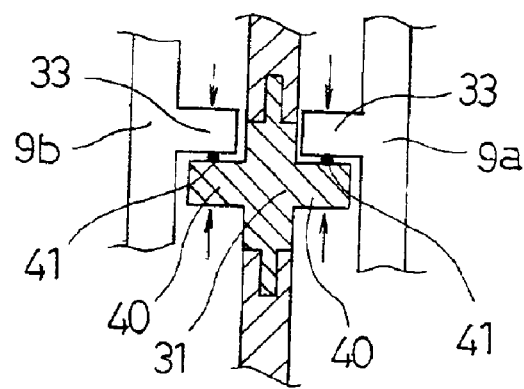
FIG. 30 is a vertical cross-sectional front view showing a variation of the fifteenth embodiment.

Aside from the above-described tapered connection surface 32, the connection surface of the electroconductive connector 31 to be exposed within the cell case 4 may be configured as shown in FIG. 30: a connection surface 40 facing upward is provided to come into surface contact with the lower surface of the raised portion 33 of the lead portions 9a and 9b. Rather than using laser beam irradiation, the contact surface is welded by forming a resistance weld 41 by pressing the surfaces against one another as indicated by the arrows and applying the welding current.

[Sixteenth Embodiment]

Next, a sixteenth embodiment of the prismatic battery module of the invention is described with reference to FIGS. 31A and 31B.

Figure 31A:
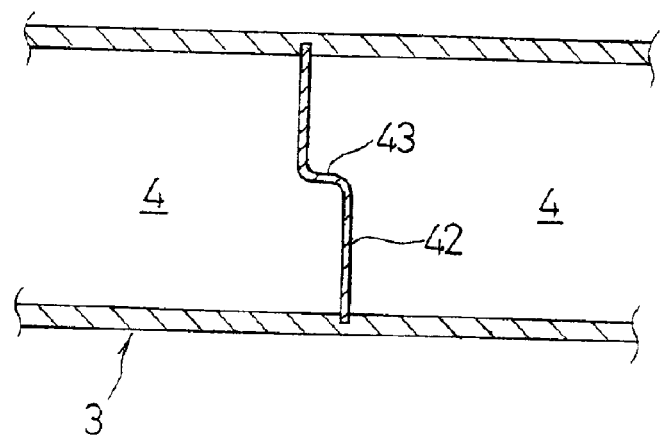
FIG. 31A is a horizontal cross-sectional view showing a separation wall of the prismatic battery case in accordance with a sixteenth embodiment of the prismatic battery module of the invention.
Figure 31B:
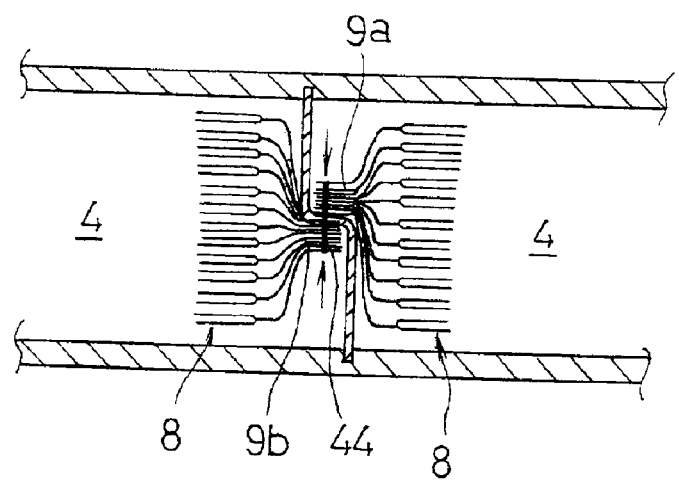
FIG. 31B is a horizontal cross-sectional view showing the separation wall connected to the electrode plate groups.

Referring to FIGS. 31A and 31B, a crank-shaped connector plate 42 includes a connection surface 43 at the middle portion thereof along the width of the cell case. The connection surface 43 extends in the direction of the arrangement of the cell cases 4. The lead portions 9a and the lead portions 9b of the respective electrode plates 8 that are to be connected are extended in order to be placed on both sides of the connection surface 43 so that the stack of the lead portions 9a and the stack of the lead portions 9b are positioned side by side. The stack of the lead portions 9a and the stack of the lead portions 9b of each electrode plate group 8 are pressed against one another from above the battery case as indicated by the arrows, with the connection surface 43 interposed between them. The welding current is then applied to connect the stacks of the lead portions 9a and 9b of the respective electrode plate groups 8 with each other, with the connection surface 43 interposed between them.

This embodiment achieves reliable connection with reduced resistance since the lead portions 9a and 9b each include an extension to allow the stacks of the lead portions 9a and 9b to be welded to one another, with the connection surface 43 of the crank-shaped connector plate 42 interposed between them.

The prismatic battery module of the present invention, as well as its manufacturing method, is advantageous in that it reduces the heat generation of the battery and realize a high power battery with longer life and in that the resistance of the components is minimized to reduce the internal resistance of individual cells. Not requiring collector plates, the prismatic battery module of the present invention is also advantageous in that it reduces the manufacturing cost and achieve a cell case with a smaller volume. The present invention is particularly advantageous when applied to battery modules using battery cases made of synthetic resin, exhibiting a relatively low cooling performance.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A prismatic battery module comprising:
    a prismatic battery case having a plurality of prismatic cell cases connected to one another through a plurality of separation walls;
    an electroconductive connector forming at least a central part of the separation wall arranged between the cell cases;

an electrode plate group arranged in each of the plurality of cell cases, the electrode plate group including positive electrode plates, negative electrode plates, and separators interposed therebetween, and further forming lead portions by projecting one side portion of the positive electrode plates and one side portion of the negative electrode plates in opposite directions, respectively; and an electrolyte accommodated in each of the cell cases, wherein the positive electrode plates and the negative electrode plates are directly connected to the respective electroconductive connectors arranged on both sides of each cell case, wherein the lead portions of the electrode plates include projections, the projections being joined together to form a raised portion, and the electroconductive connector is integrally formed with a separation wall separating the cell cases from one another, the electroconductive connector having a connection surface that comes into contact with a side of the raised portion of the lead portions, and wherein the raised portion or the lead portions is brought into contact with the electroconductive connector.

2. A prismatic battery module comprising:

a prismatic battery case having a plurality of prismatic cell cases connected to one another through separation walls;

an electroconductive connector forming at least part of the separation wall arranged between the cell cases;

an electrode plate group arranged in each of the plurality of cell cases, the electrode plate group including positive electrode plates, negative electrode plates, and separators interposed therebetween, and further forming lead portions by projecting one side portion of the positive electrode plates and one side portion of the negative electrode plates in opposite directions, respectively; and an electrolyte accommodated in each of the cell cases, wherein the positive electrode plates and the negative electrode plates are connected to the respective electroconductive connectors arranged on both sides of each cell case;

wherein the lead portions of the electrode plates include projections, the projections being joined together to form a raised portion, and an electroconductive connector is integrally formed with a separation wall separating the cell cases from one another, the electroconductive connector having a connection surface that comes into contact with a side of the raised portion of the lead portions, wherein the raised portion of the lead portions is brought into contact with the electroconductive connector; and wherein the pair of the connection surfaces are exposed in the cell cases on both sides of the electroconductive connector and are formed as a pair of tapered connection surfaces that come close to one another in a tapered fashion as they extend upward, while the raised portion of the lead portions includes an end surface that is formed as a sloped surface to come in surface contact with each of the tapered connection surfaces.

* * * * *